(12) United States Patent
Nagasaka et al.

(10) Patent No.: US 9,451,228 B2
(45) Date of Patent: Sep. 20, 2016

(54) DISPLAY CONTROL DEVICE, RECORDING CONTROL DEVICE, AND DISPLAY CONTROL METHOD

(71) Applicant: Sony Corporation, Tokyo (JP)

(72) Inventors: Hideo Nagasaka, Kanagawa (JP);
Shunji Yoshimura, Tokyo (JP);
Noboru Murabayashi, Saitama (JP);
Tomonori Misawa, Tokyo (JP);
Nobuyoshi Miyokawa, Chiba (JP)

(73) Assignee: Sony Corporation (JP)

( * ) Notice: Subject to any disclaimer, the term of this patent is extended or adjusted under 35 U.S.C. 154(b) by 369 days.

(21) Appl. No.: 14/018,893

(22) Filed: Sep. 5, 2013

(65) Prior Publication Data

US 2014/0072275 A1 Mar. 13, 2014

(30) Foreign Application Priority Data

Sep. 13, 2012 (JP) ................................. 2012-201548

(51) Int. Cl.
| | |
|---|---|
| *H04N 9/79* | (2006.01) |
| *G11B 27/10* | (2006.01) |
| *H04N 9/82* | (2006.01) |
| *G11B 27/28* | (2006.01) |
| *H04L 29/06* | (2006.01) |

(52) U.S. Cl.
CPC ................ *H04N 9/79* (2013.01); *G11B 27/10* (2013.01); *G11B 27/102* (2013.01); *G11B 27/28* (2013.01); *H04N 9/8205* (2013.01); *H04N 9/8211* (2013.01); *H04L 65/601* (2013.01)

(58) Field of Classification Search
CPC ..................... H04N 21/812; H04N 21/25891; H04N 7/025; H04N 5/76; G06Q 30/0277; G06Q 30/0251
See application file for complete search history.

(56) References Cited

U.S. PATENT DOCUMENTS

| | | | | |
|---|---|---|---|---|
| 8,000,581 | B2 * | 8/2011 | Zalewski | G06Q 30/02 386/248 |
| 8,606,637 | B1 * | 12/2013 | Delker | G06Q 30/00 705/14.66 |
| 2002/0124249 | A1 * | 9/2002 | Shintani | H04N 5/76 725/32 |
| 2002/0144262 | A1 * | 10/2002 | Plotnick | G11B 27/005 725/32 |
| 2003/0046189 | A1 * | 3/2003 | Asayama | G06F 21/629 705/14.61 |
| 2006/0034590 | A1 * | 2/2006 | Teramoto | H04N 5/85 386/247 |
| 2012/0245998 | A1 * | 9/2012 | Takami | G06Q 30/02 705/14.49 |

FOREIGN PATENT DOCUMENTS

| | | |
|---|---|---|
| JP | 2005102109 A | 4/2005 |
| JP | 2006025156 A | 1/2006 |
| JP | 2007318196 A | 12/2007 |

(Continued)

OTHER PUBLICATIONS

Japanese Office Action for JP Application No. 2012201548, dated Dec. 1, 2015.

(Continued)

*Primary Examiner* — Huy T Nguyen
(74) *Attorney, Agent, or Firm* — Lerner, David, Littenberg, Krumholz & Mentlik, LLP

(57) ABSTRACT

There is provided a display control device including a related content acquisition unit that acquires related content that relates to predetermined video content, and a display controller that applies control to display the related content after the predetermined video content is recorded.

19 Claims, 23 Drawing Sheets

(56) References Cited

FOREIGN PATENT DOCUMENTS

| | | | |
|---|---|---|---|
| JP | 2008042333 | A | 2/2008 |
| JP | 2008136168 | A | 6/2008 |
| JP | 2010152744 | A | 7/2010 |
| JP | 2010-273083 | A | 12/2010 |
| JP | 2011259413 | A | 12/2011 |
| WO | 2008139571 | A1 | 11/2008 |

OTHER PUBLICATIONS

Japanese Office Action for Application No. 2012-201548 dated Mar. 29, 2016.

Japanese Office Action for Application No. 2012-201548 dated Jul. 15, 2016.

* cited by examiner

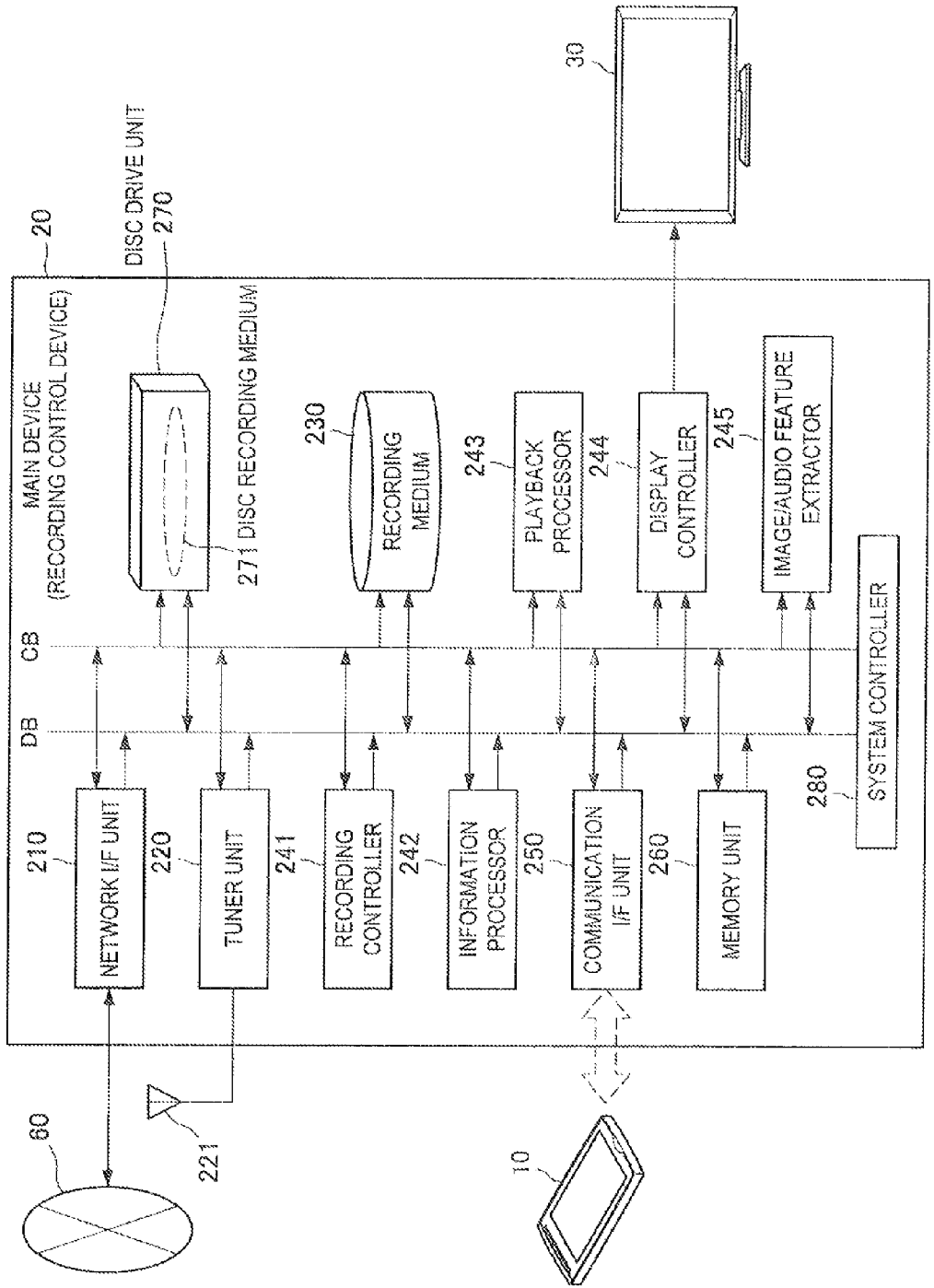

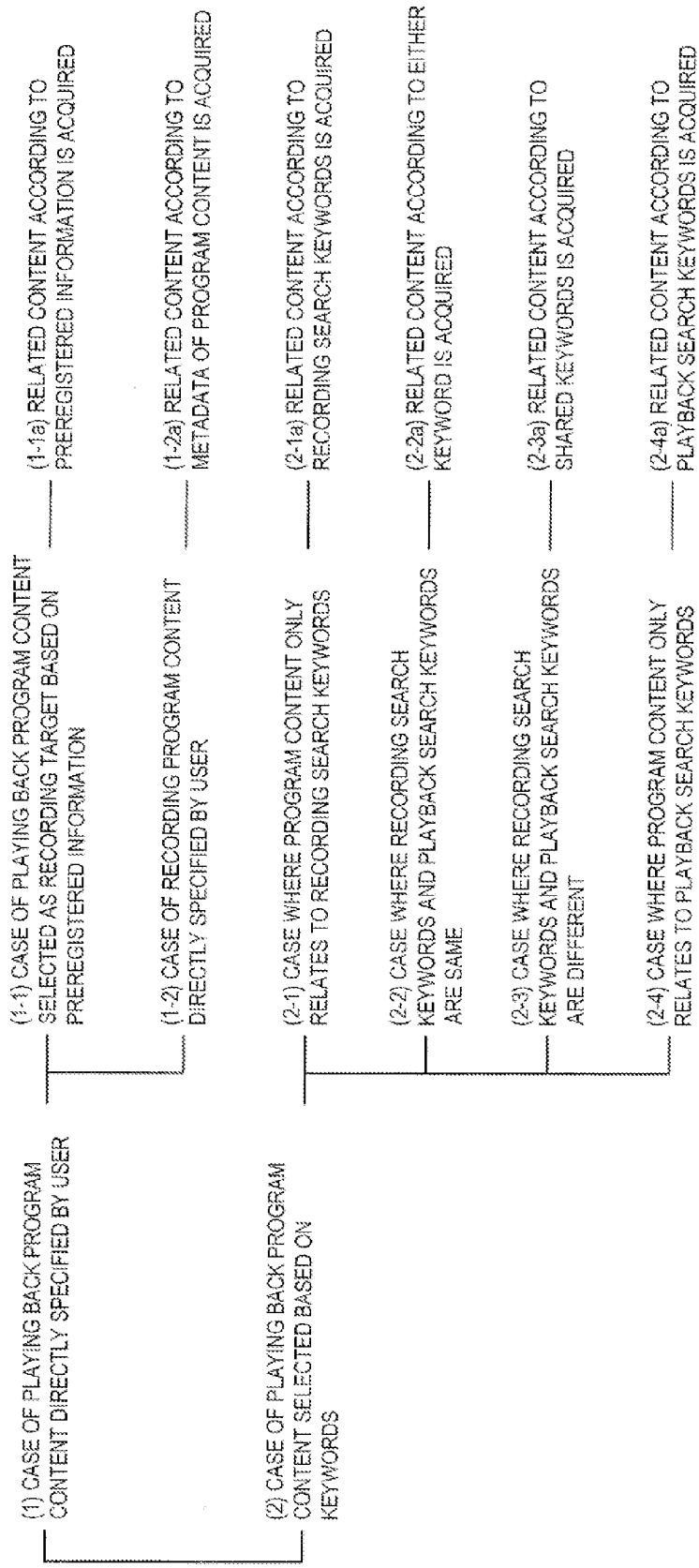

FIG.5

| | RELATION BETWEEN PROGRAM CONTENT AND KEYWORD | PROGRAM CONTENT | RECORDING SEARCH KEYWORD | PLAYBACK SEARCH KEYWORD | KEYWORD USED TO SEARCH FOR RELATED CONTENT | EXAMPLE OF RELATED CONTENT |
|---|---|---|---|---|---|---|
| 1 | CASE WHERE PROGRAM CONTENT ONLY RELATES TO RECORDING CONTENT SEARCH KEYWORDS | | MAJOR LEAGUE BASEBALL | HOME RUN MATSU* | MAJOR LEAGUE BASEBALL | AD OF MAJOR LEAGUE SPECTATOR TOUR<br>DISCOUNT! MAJOR LEAGUE SPECTATOR TOUR<br>***TOURIST |
| 2 | CASE WHERE RECORDING CONTENT SEARCH KEYWORDS AND PLAYBACK CONTENT SEARCH KEYWORDS ARE SAME | | MEAL | MEAL | MEAL | AD OF FOOD<br>DELICIOUS! NUTRITIOUS!<br>*FOOD |
| 3 | CASE WHERE RECORDING CONTENT SEARCH KEYWORDS AND PLAYBACK CONTENT SEARCH KEYWORDS ARE DIFFERENT | | OLYMPIC LONDON GYMNASTICS | OLYMPIC LONDON UCHIMURA** TANAKA** | (SHARED KEYWORDS) OLYMPIC LONDON | AD OF OLYMPIC SPECTATOR TOUR<br>ENJOY LONDON OLYMPIC INCLUDING LONDON SIGHTSEEING<br>***TOURIST |
| 4 | CASE WHERE PROGRAM CONTENT ONLY RELATES TO PLAYBACK CONTENT SEARCH KEYWORDS | | MAJOR LEAGUE BASEBALL | HOME RUN MATSU* | HOME RUN MATSU* | AD WITH MATSU**<br>TASTES GOOD! ** BEER<br>NON-ALCOHOLIC 0% ALCOHOL |

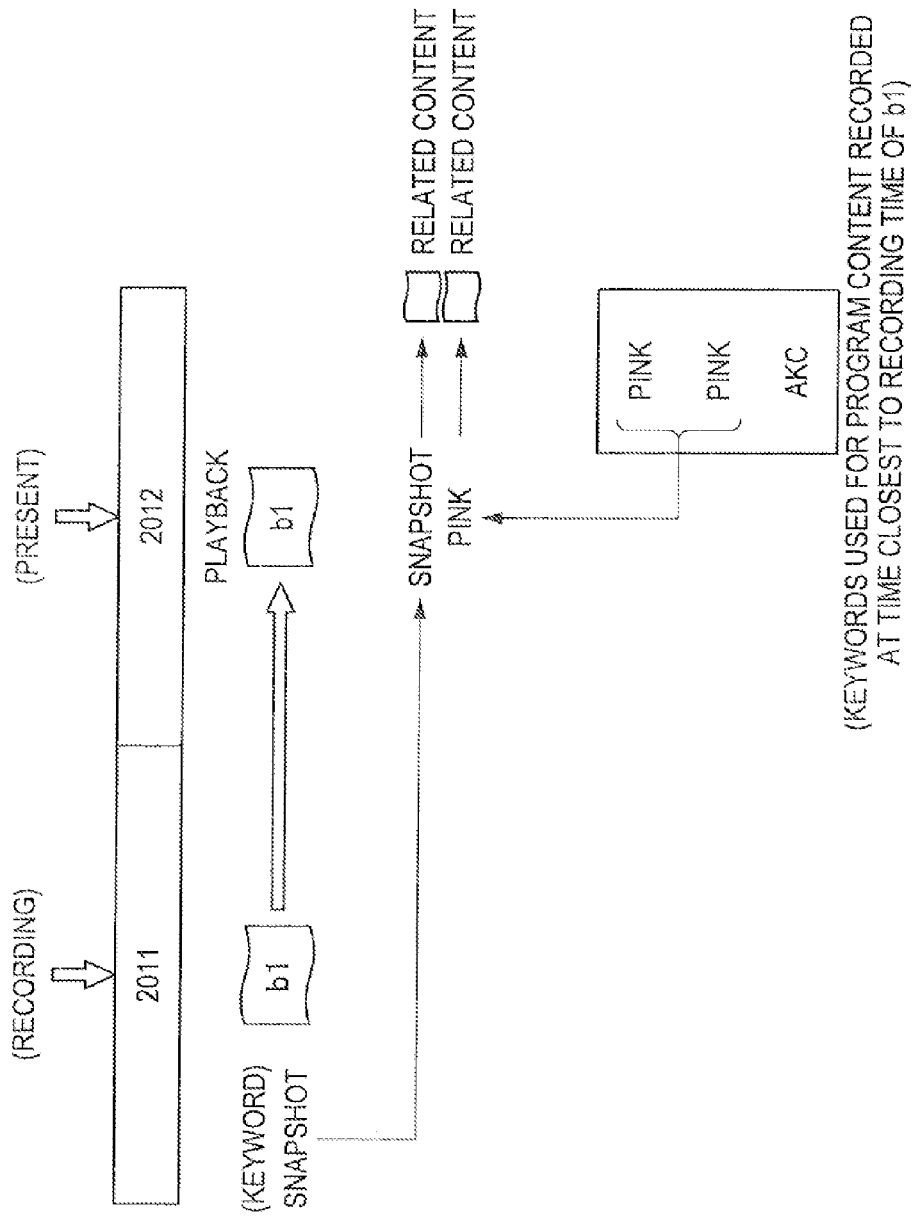

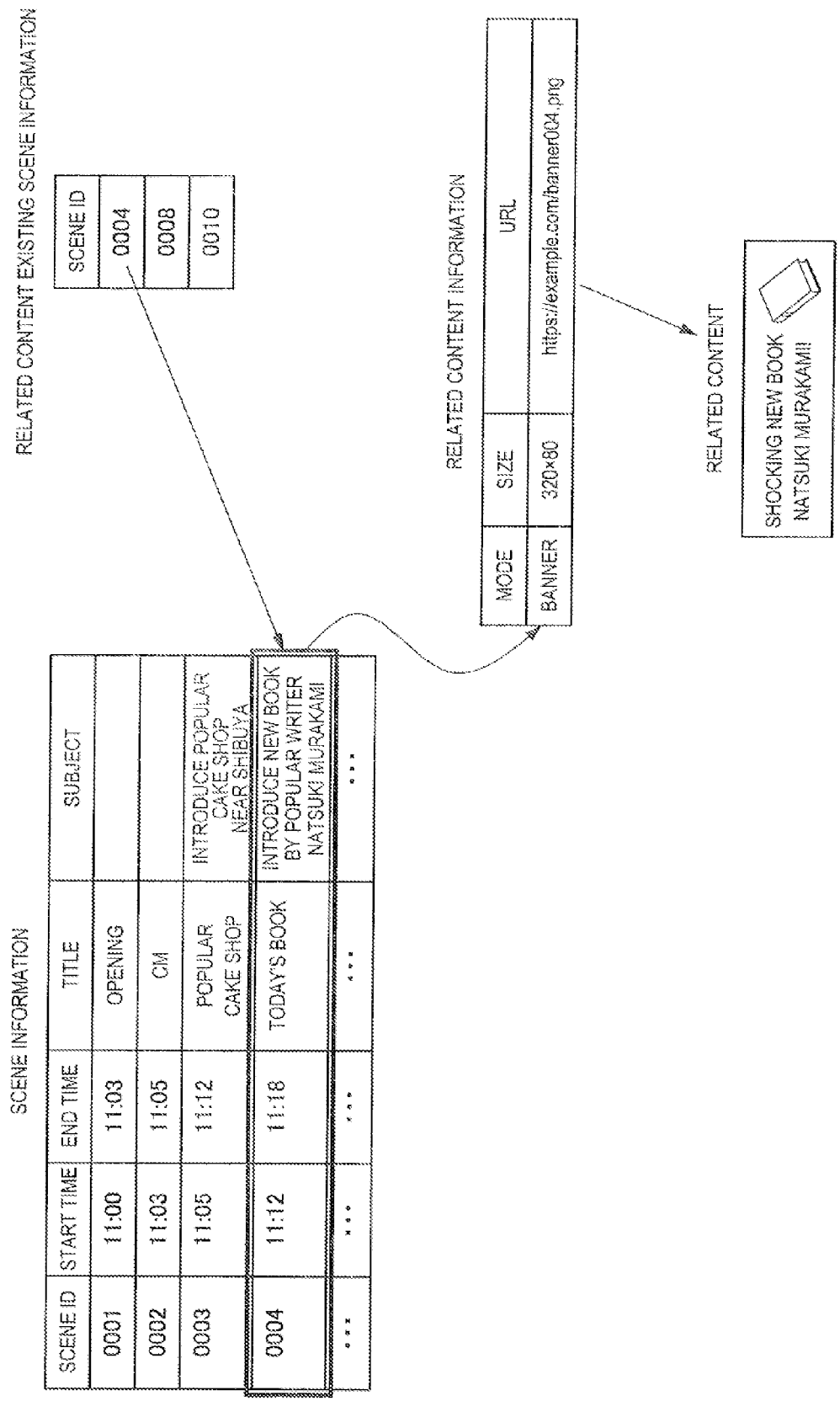

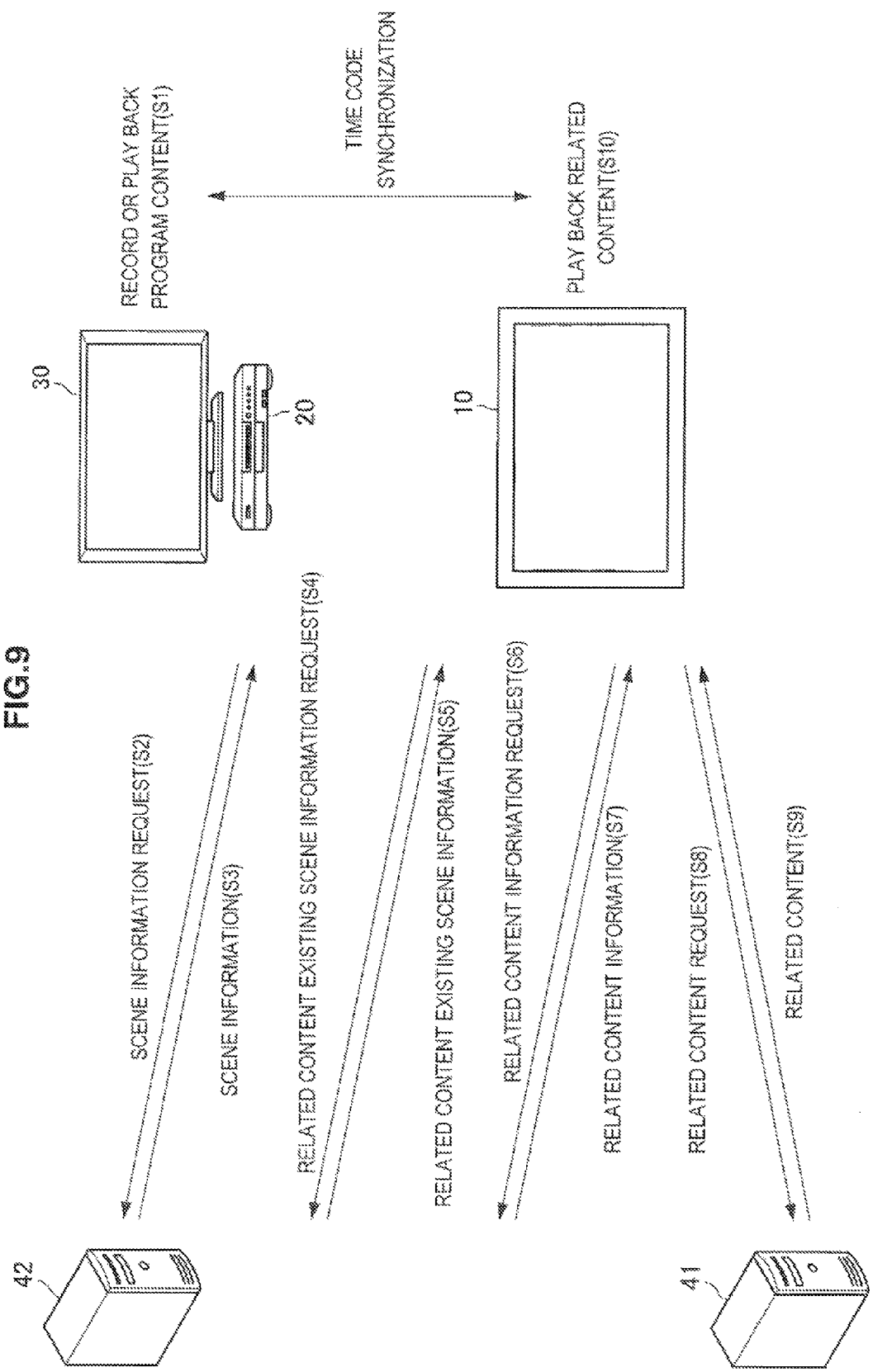

FIG.10

INTEGRATION DEVICE (1 DEVICE)

BROAD GENRE: ALL

| CONTENT | SCHEDULE FOR RECORDING | | INPUT KEYWORD |

SORT: DATE ORDER (REVERSE CHRONOLOGICAL ORDER) ... 59 PROGRAMS

| | GENRE | | DATE | TITLE | SIZE |
|---|---|---|---|---|---|
| All | ALL GENRE | | | INVITATION FROM COUNTRIES | |
| | MOVIE | | TUE 3/13/2012 5:45PM (0H15M) [再] | | ABOUT 0.3GB |
| | NO GENRE | | | 100 JAPANESE CLASSIC MOVIES | |
| | SPORTS | | TUE 3/13/2012 3:45AM (3H15M) [再] | | ABOUT 0.1GB |
| | MUSIC | | | TRAVEL IN CHINA: CHINA'S 4,000 YEAR HISTORY | |
| | DRAMA | | MON 3/12/2012 6:30AM (0H55M) [再] | | ABOUT 9.3GB |
| | ANIME/SPECIAL-EFFECTS | | | TUESDAY SUSPENSE DRAMA "END ON THE CLIFF" | |
| | NEWS/REPORTS | | SAT 3/10/2012 12:00PM (1H57M) [再] | | ABOUT 18.9GB |
| | VARIETY | | | STUDY BASEBALL #5 | |
| | DOCUMENTARY/EDUCATION | | SAT 3/10/2012 2:30AM (0H30M) [再] | | ABOUT 0.5GB |
| | INFOTAINMENT/TABLOID SHOW | | | TETSUO'S HOUSE: UNTOLD STORY BEHIND LEADER'S DEBUT | |

DISCOUNT! MAJOR LEAGUE SPECTATOR TOUR — STUDY BASEBALL #5 — TITLE OF PROGRAM BEING PLAYED BACK

K1

20:07

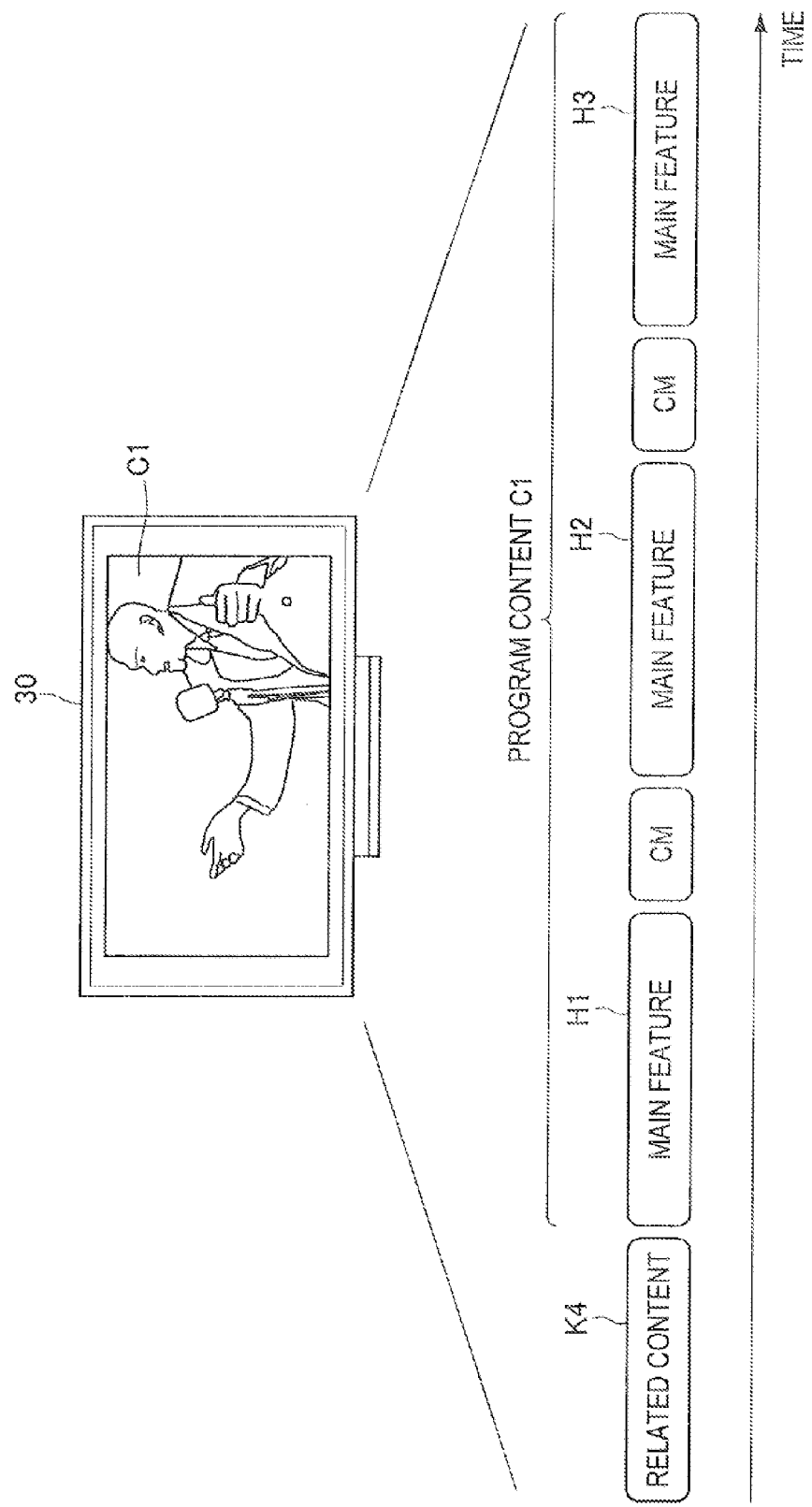

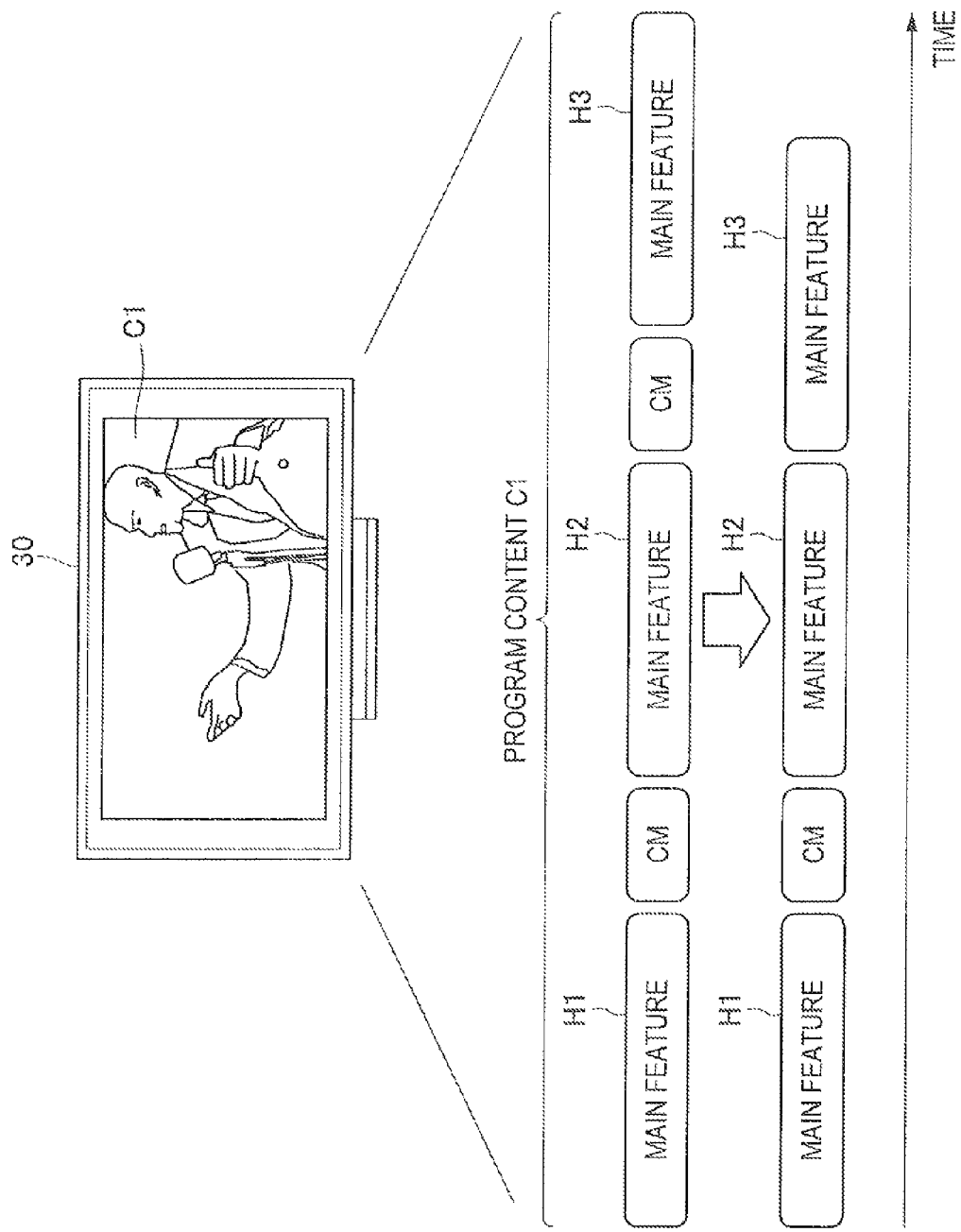

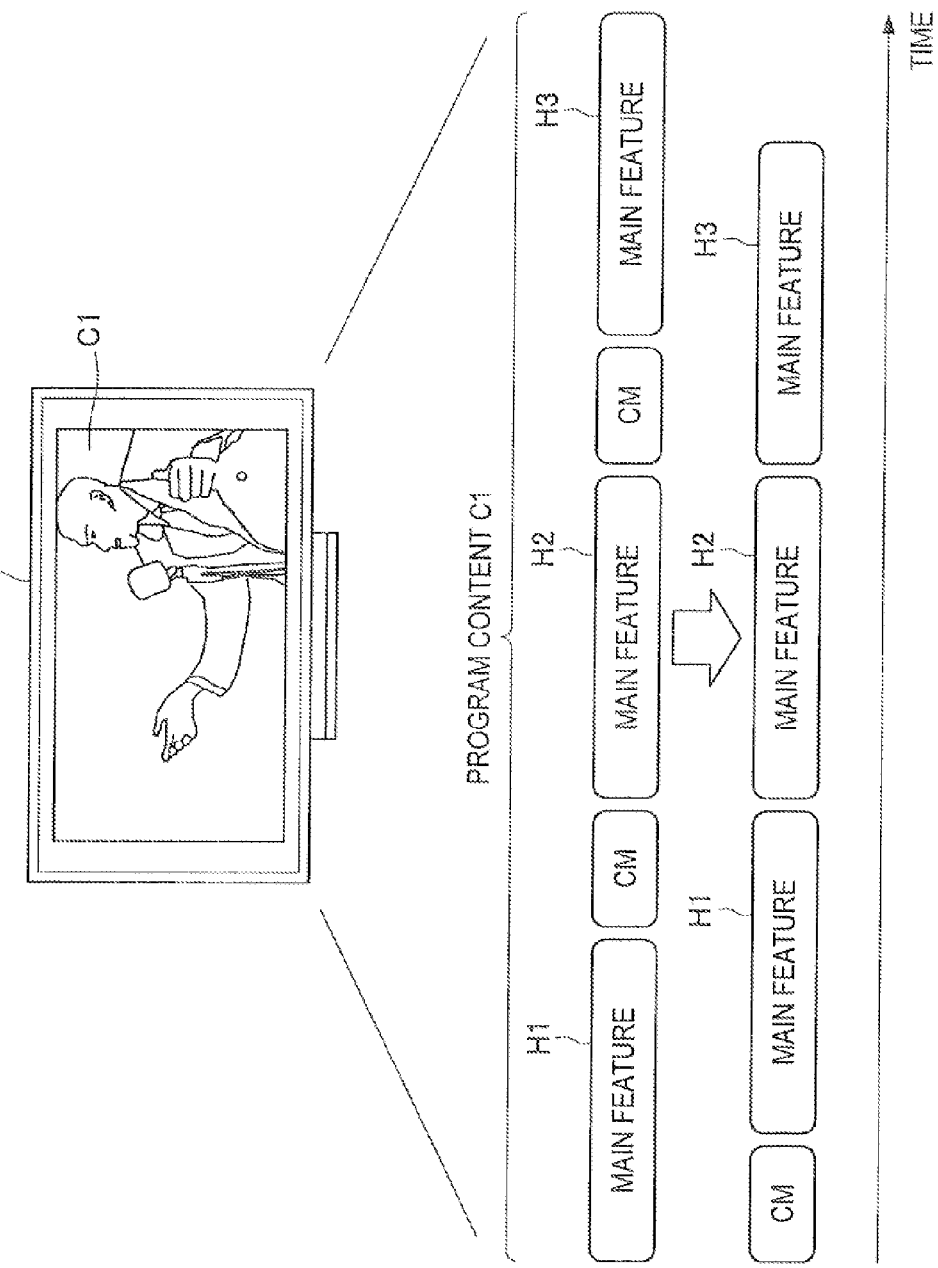

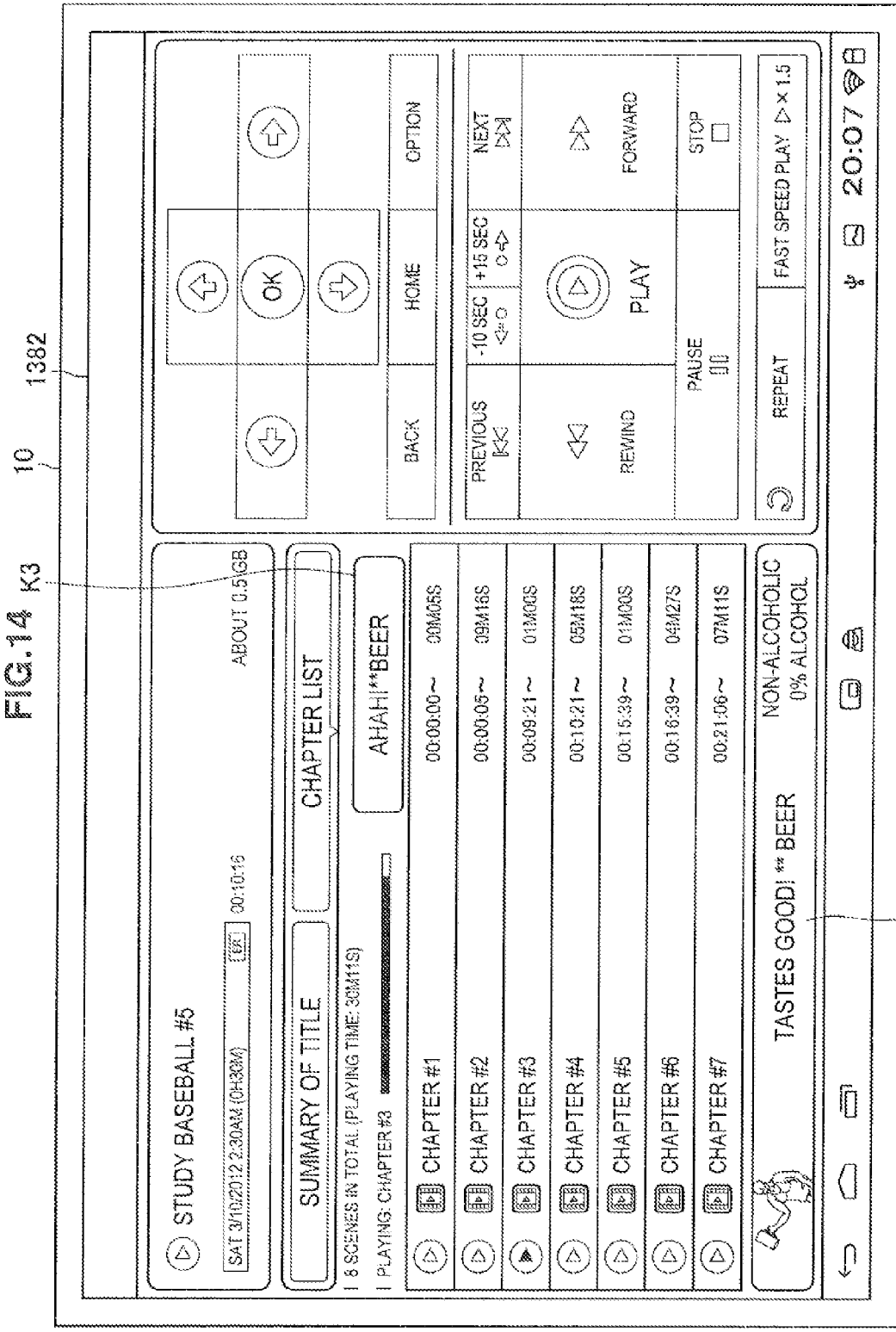

FIG.19
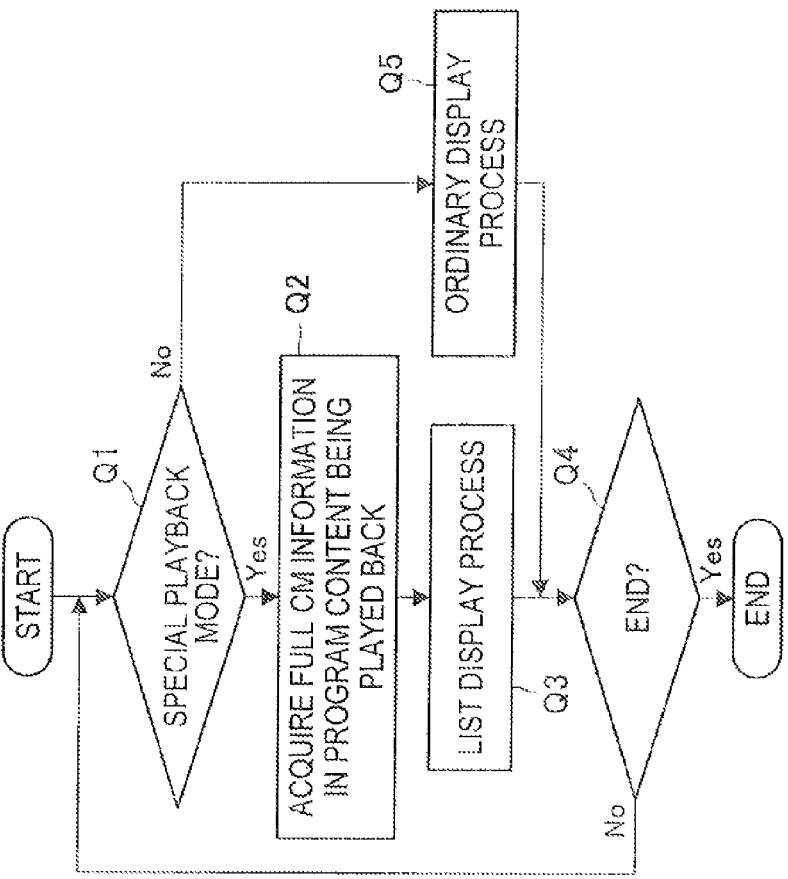
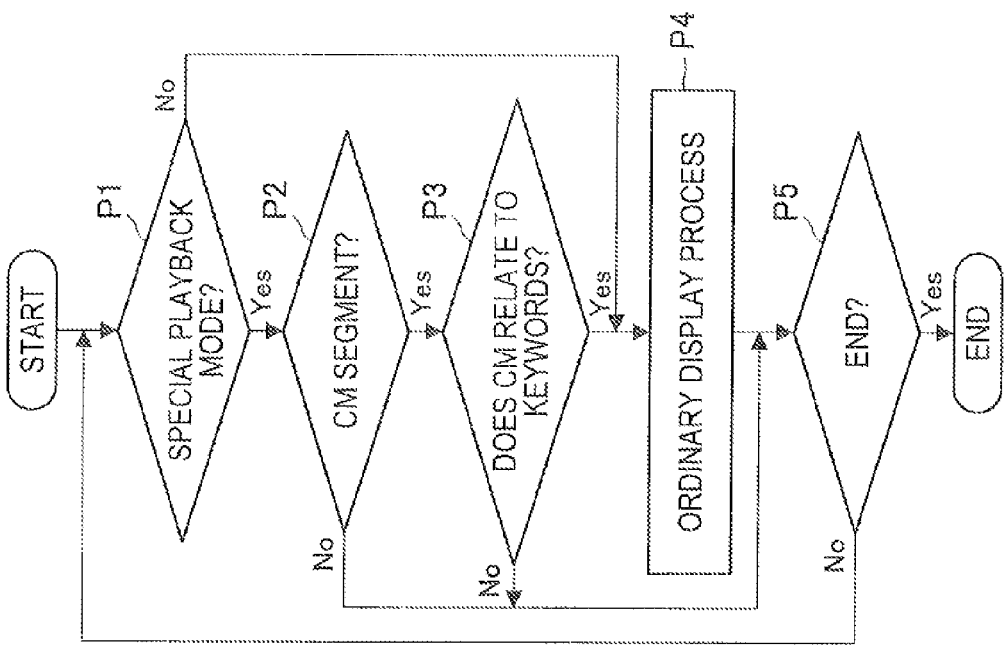

FIG. 20
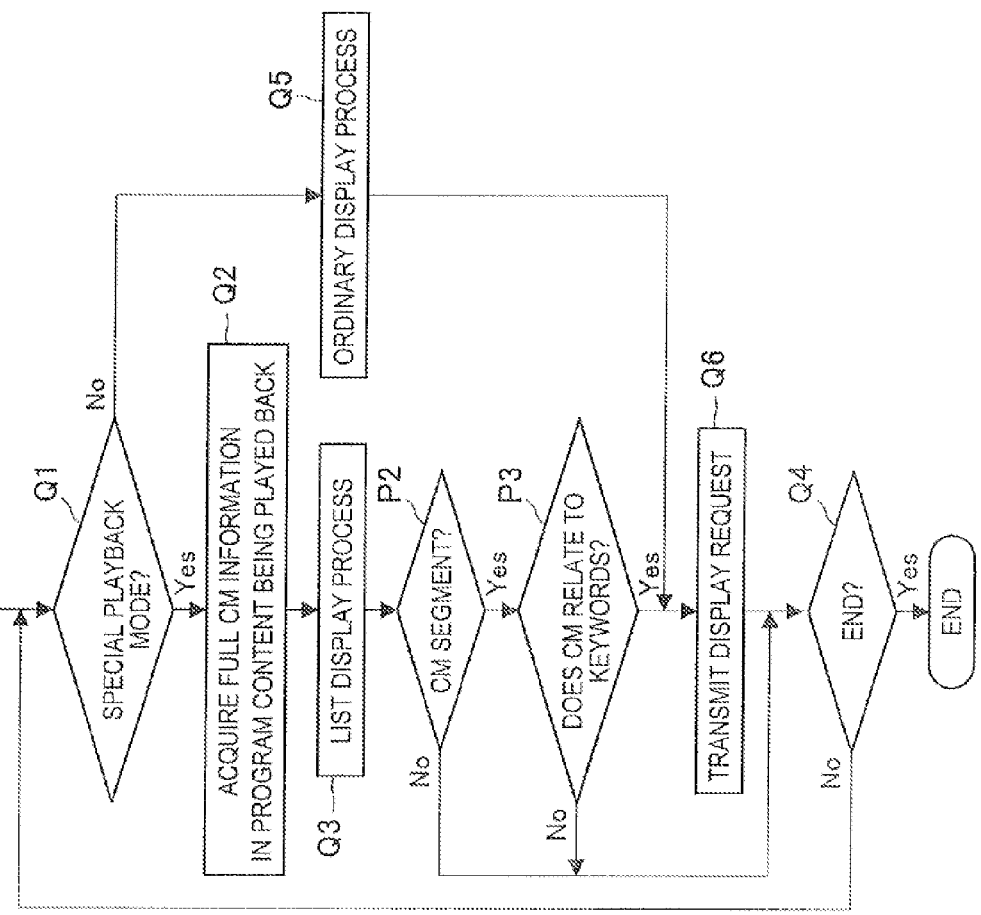
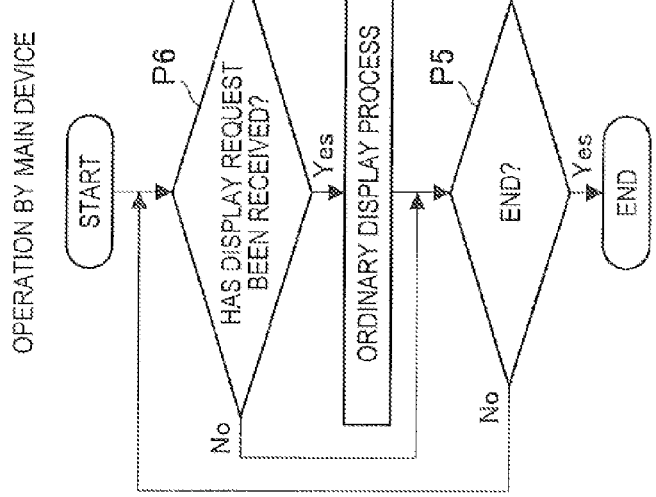

DISPLAY CONTROL DEVICE, RECORDING CONTROL DEVICE, AND DISPLAY CONTROL METHOD

BACKGROUND

The present disclosure relates to a display control device, a recording control device, and a display control method.

Technology that provides a user with related content that relates to predetermined video content now exists. If such technology can make a user become interested in related content that relates to predetermined video content, for example, it becomes possible to broaden the range of the user's interests and generate new business. One technology that provides related content to a user is the technology disclosed in Japanese Unexamined Patent Application Publication No. 2010-273083, for example.

SUMMARY

However, with technology that provides a user with related content that relates to predetermined video content, the related content is typically provided to the user before the predetermined video content is recorded. For this reason, it is difficult to provide a user with related content that accounts for information such as the user's rating of the predetermined video content. Consequently, it is desirable to provide technology for displaying related content after the predetermined video content is recorded.

According to an embodiment of the present disclosure, there is provided a display control device including a related content acquisition unit that acquires related content that relates to predetermined video content, and a display controller that applies control to display the related content after the predetermined video content is recorded.

Further, according to an embodiment of the present disclosure, there is provided a recording control device including a recording controller that applies control to record predetermined video content, and a display controller that applies control to display the predetermined video content. Control is applied to display related content that relates to the predetermined video content after the predetermined video content is recorded by the recording controller.

Further, according to an embodiment of the present disclosure, there is provided a display control method including acquiring related content that relates to predetermined video content, and applying control to display the related content after the predetermined video content is recorded.

According to the present disclosure as described above, it is possible to provide technology for displaying related content that relates to predetermined video content after the predetermined video content is recorded.

BRIEF DESCRIPTION OF THE DRAWINGS

FIG. 3 is a diagram illustrating an exemplary configuration of a main device according to an embodiment of the present disclosure;

FIG. 4 is a diagram illustrating a list of examples of acquiring related content;

FIG. 5 is a diagram illustrating a table of examples of acquiring related content;

FIG. 7 is a diagram illustrating an example of creating keywords used to acquire related content (for the case of using a keyword used in the past);

FIG. 8 is a diagram illustrating an example of the flow of data up to related content acquisition;

FIG. 9 is a diagram illustrating an example of the flow of operations up to related content acquisition;

FIG. 10 is a diagram illustrating an example of the display of related content (for the case of using a banner ad);

FIG. 11 is a diagram illustrating an example of the display of related content (for the case of using a pre-roll ad);

FIG. 12 is a diagram illustrating an example of skipping a commercial (CM) included in program content;

FIG. 13 is a diagram illustrating an example of moving a CM included in program content;

FIG. 14 is a diagram illustrating an example of the display of related content (for the case of using related content that relates to program content to be played back);

FIG. 19 is a flowchart illustrating an example of the flow of operation by a display control system according to an embodiment of the present disclosure (for the case of using related content linked to program content to be played back);

FIG. 20 is a flowchart illustrating an example of the flow of operation by a display control system according to an embodiment of the present disclosure (for the case of using related content linked to program content to be played back);

DETAILED DESCRIPTION OF THE EMBODIMENT(S)

Figure 1:
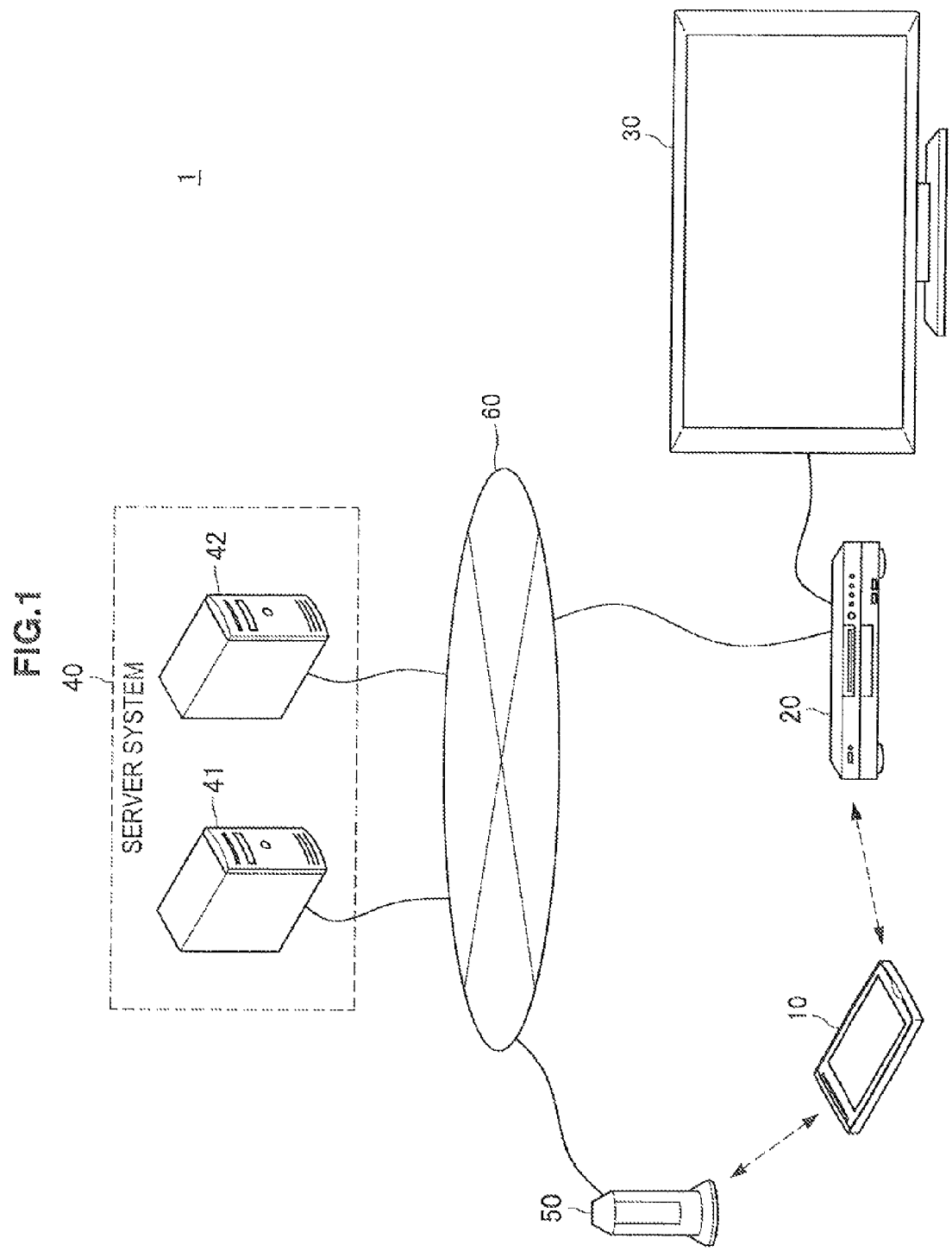
FIG. 1 is a diagram illustrating an exemplary configuration of a display control system according to an embodiment of the present disclosure.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Also, in this specification and the appended drawings, multiple structural elements having substantially the same function and structure may in some cases be distinguished by different letters appended to the same sign. On the other hand, when not particularly distinguishing each of multiple structural elements having substantially the same function and structure, only the sign will be given.

In addition, the detailed description of the embodiments in this section will be given in the order indicated below.
1. Exemplary configuration of display control system
2. Exemplary functional configuration of tablet
3. Exemplary functional configuration of main device
4. Description of related content acquisition
5. Description of related content display control
6. Exemplary operation of display control system
7. Conclusion

1. EXEMPLARY CONFIGURATION OF DISPLAY CONTROL SYSTEM

First, an exemplary configuration of a display control system 1 according to an embodiment of the present disclosure will be described. FIG. 1 is a diagram illustrating an exemplary configuration of a display control system 1 according to an embodiment of the present disclosure. As illustrated in FIG. 1, the display control system 1 is equipped with a tablet 10 as an example of a display control device, and a main device 20 as an example of a recording control device. In addition to the above, the display control system 1 is equipped with components such as a display device 30, a server system 40, and an access point 50.

Hereinafter, a description will be given using the tablet 10 as an example of a display control device, but since the tablet 10 is merely one example of a display control device, another display control device instead of the tablet 10 may also be used. Likewise, a description will be given using the main device 20 as an example of a recording control device, but since the main device 20 is merely one example of a recording control device, another recording control device instead of the main device 20 may also be used.

The tablet 10 is capable of remotely controlling the main device 20 by transmitting a wireless signal corresponding to a user operation to the main device 20. For example, the tablet 10 is capable of performing actions such as recording program content, playing back recorded program content, and searching program content by remote control. The recording of program content may also be scheduled recording of program content. Program content at least includes predetermined video content (content that at least includes images), for example, and may be content that additionally includes audio, and may also include data in other formats.

Also, as illustrated in FIG. 1, the tablet 10 is capable of connecting to a network 60 via the access point 50, for example. The connection to the network 60 by the tablet 10 may be performed in a wired or wireless manner. The tablet 10 may be a smartphone, a mobile phone, a personal computer (PC), or other client device.

The main device 20 is capable of performing various operations on the basis of wireless signals received from the tablet 10. For example, the main device 20 is capable of performing actions such as recording program content, playing back recorded program content, and searching program content by remote control from the tablet 10. The main device 20 is able to receive program content from a broadcasting station, for example.

Also, as illustrated in FIG. 1, the main device 20 is capable of connecting to the network 60, for example. The connection to the network 60 by the main device 20 may be performed in a wired or wireless manner. The type of main device 20 is not particularly limited insofar as control of the display of program content on a display device 30 is possible. The main device 20 may be a hard disk drive (HDD) recorder or a Blu-Ray Disc (BD) recorder, for example.

The display device 30 is capable of displaying program content according to display control by the main device 20. The display device 30 corresponds to a television, for example, but the type of display device 30 is not particularly limited insofar as the device is capable of displaying program content. Although the display device 30 and the main device 20 are connected in a wired manner in the example illustrated in FIG. 1, the display device 30 and the main device 20 may also be connected wirelessly.

As illustrated in FIG. 1, the server system 40 includes a related content server 41 and a post-metadata server 42, for example. In this specification, metadata added to program content before that program content is broadcast (such as electronic program guide (EPG) data, for example) is specifically designated "pre-metadata". On the other hand, metadata added to program content after the program content is broadcast (such as metadata in which information is generated as the program proceeds by a predetermined operator during the broadcast or after the broadcast, such as information on shops introduced in a special segment of the program (hereinafter referred to as a "corner") or over the course of program, or metadata on comments written by viewers regarding the program content, for example) is specifically designated "post-metadata".

The related content server 41 delivers related content that relates to program content. Herein, related content is content that at least includes images, for example, and may be content that additionally includes audio, and may also include data in other formats, similarly to the program content.

The post-metadata server 42 delivers post-metadata. Although the related content server 41 and the post-metadata server 42 are realized separately in the example illustrated in FIG. 1, the related content server 41 and the post-metadata server 42 may also be integrated. Also, although the related content server 41 and the post-metadata server 42 are connected to the tablet 10 via the network 60 in the example illustrated in FIG. 1, at least one of the related content server 41 and the post-metadata server 42 may also be provided inside the tablet 10, or connected via a dedicated line.

The foregoing thus describes an exemplary configuration of a display control system 1 according to an embodiment of the present disclosure.

2. EXEMPLARY FUNCTIONAL CONFIGURATION OF TABLET

Figure 2:
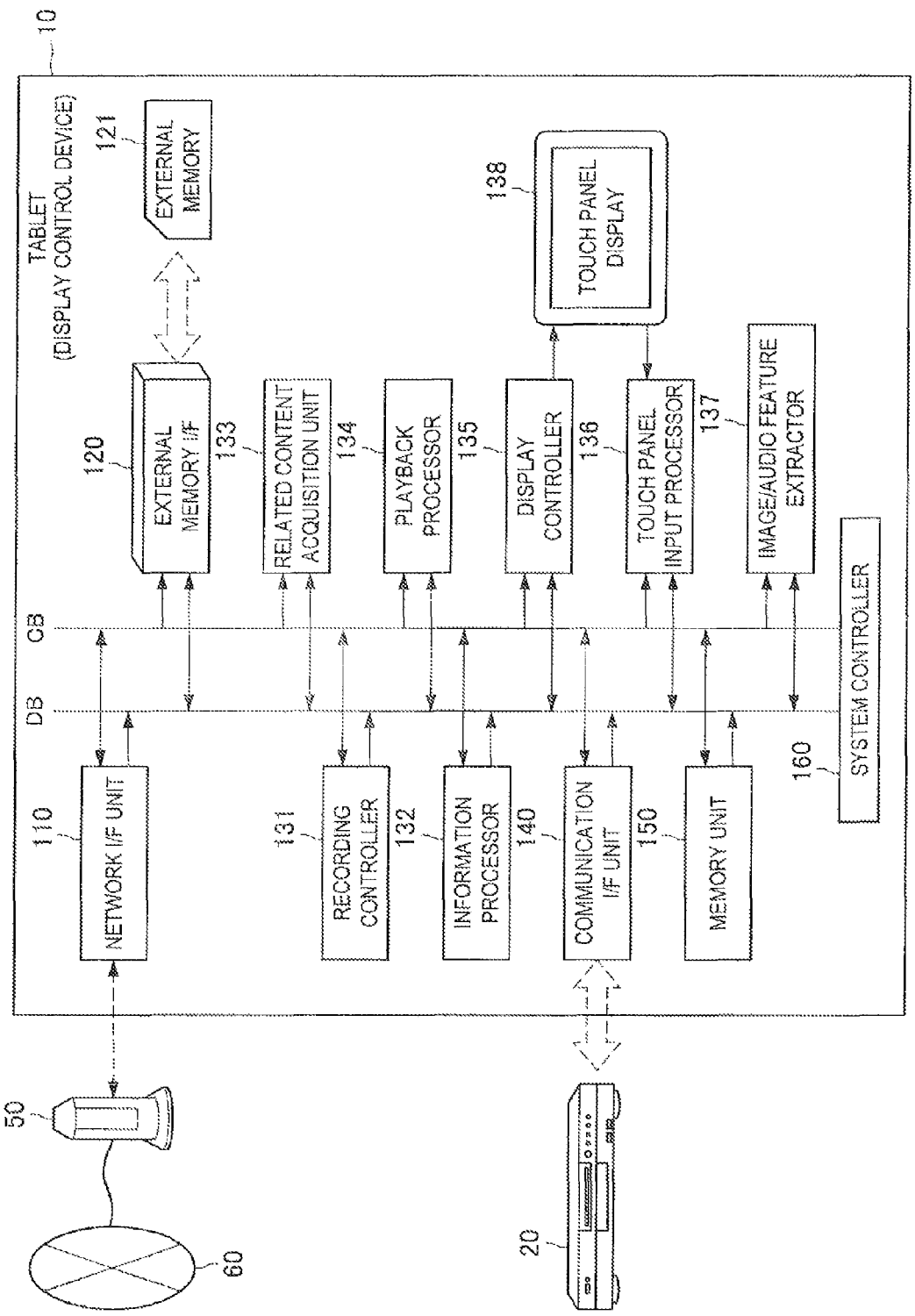
FIG. 2 is a diagram illustrating an exemplary configuration of a tablet according to an embodiment of the present disclosure.

Next, an exemplary functional configuration of a tablet 10 according to an embodiment of the present disclosure will be described. FIG. 2 is a diagram illustrating an exemplary functional configuration of a tablet 10 according to an embodiment of the present disclosure. As illustrated in FIG. 2, each of the function blocks constituting the tablet 10 is connected to a data bus DB and a control bus CB.

Also, as illustrated in FIG. 2, the tablet 10 is equipped with a network interface (I/F) unit 110, an external memory I/F 120, external memory 121, a recording controller 131, an information processor 132, a related content acquisition unit 133, a playback processor 134, and a display controller 135. The tablet 10 is also equipped with a touch panel input processor 136, an image/audio feature extractor 137, a touch panel display 138, a communication I/F unit 140, memory unit 150, and a system controller 160.

The network I/F unit 110 includes functionality for connecting to the network 60 via the access point 50. The external memory 121 is a recording medium able to be removed from the tablet 10. The external memory I/F 120 includes functionality for reading and writing data with respect to the external memory 121. The recording controller 131 includes functionality for controlling the reading and writing of data with respect to the external memory 121 and the memory unit 150.

The information processor 132 includes functionality for conducting various information processing. For example, the information processor 132 may include functionality for detecting commercial message (CM) segments from program content. For example, the information processor 132 may detect a CM segment on the basis of metadata attached to program content, and may also determine a CM segment on the basis of features extracted by the image/audio feature extractor 137. Hereinafter, CMs may also be designated advertising content in some cases.

The related content acquisition unit 133 includes functionality for acquiring related content that relates to program content. Herein, a variety of cases are envisioned regarding how the related content acquisition unit 133 acquires related content that relates to particular program content. For this reason, a detailed description regarding how the related content acquisition unit 133 acquires related content that relates to particular program content will be given later. The playback processor 134 includes functionality for playing back related content.

The display controller 135 includes functionality for applying control such that related content is displayed after program content is recorded. As described earlier, with technology that provides a user with related content that relates to program content, the related content is typically provided to the user before the program content is recorded. For this reason, it is difficult to provide a user with related content that accounts for information such as the user's rating of the program content. According to the present embodiment, there is provided technology for displaying related content after the program content is recorded.

The touch panel input processor 136 includes functionality for recognizing a user operation on the basis of specific coordinates input into the touch panel display 138, and outputting the recognized user operation to the system controller 160. The image/audio feature extractor 137 extracts predetermined image/audio features from image/audio data. Potential examples of image features include global features such as chroma features, luma features, and texture features, as well as local features such as the corner features of objects found by the Harris corner detector, and scale-invariant feature transform (SIFT). Potential audio features include the average audio level of a predetermined segment length, and the power spectrum of a predetermined frequency band. Predetermined recognition processes (such as a facial recognition process and an audio recognition process, for example) are conducted on the basis of these predetermined image features and audio features. Features extracted by the image/audio feature extractor 137 may also be used to determine performers in program content, for example. Otherwise, features extracted by the image/audio feature extractor 137 may be used to determine key frames in program content.

The touch panel display 138 includes functionality for presenting a display according to display control by the display controller 135. The touch panel display 138 also includes functionality for acquiring specific coordinates input by a user, and outputting the specific coordinates to the touch panel input processor 136.

Note that although FIG. 2 illustrates a touch panel display 138 as an example of a display device and an input device, a combination of a separately realized display device and input device may also be used instead of the touch panel display 138. Although the touch panel display 138 is integrated into the tablet 10 in the example illustrated in FIG. 2, in the above case the display device may be realized separately from the tablet 10, and the tablet 10 may also be realized separately from the tablet 10.

The communication I/F unit 140 includes functionality for communicating with the main device 20. The memory unit 150 is a recording medium built into the tablet 10, and is capable of storing programs that induce the operation of components such as the recording controller 131, the information processor 132, the related content acquisition unit 133, the playback processor 134, the display controller 135, the touch panel input processor 136, the image/audio feature extractor 137, and the system controller 160, for example. The memory unit 150 is also capable of storing various data used by programs.

The system controller 160 includes functionality for controlling all function blocks present inside the tablet 10. Note that components such as the recording controller 131, the information processor 132, the related content acquisition unit 133, the playback processor 134, the display controller 135, the touch panel input processor 136, the image/audio feature extractor 137, and the system controller 160 may correspond to a processor such as a central processing unit (CPU), for example. These function blocks are able to exhibit their respective functions as a result of the execution of programs stored by the memory unit 150, for example.

The foregoing thus describes an exemplary functional configuration of a tablet 10 according to an embodiment of the present disclosure.

3. EXEMPLARY FUNCTIONAL CONFIGURATION OF MAIN DEVICE

Next, an exemplary functional configuration of a main device 20 according to an embodiment of the present disclosure will be described. FIG. 3 is a diagram illustrating an exemplary functional configuration of a main device 20 according to an embodiment of the present disclosure. As illustrated in FIG. 3, each of the function blocks constituting the main device 20 is connected to a data bus DB and a control bus CB.

Also, as illustrated in FIG. 3, the main device 20 is equipped with a network I/F unit 210, a tuner unit 220 that includes an antenna 221, a recording medium 230, a recording controller 241, an information processor 242, a playback processor 243, and a display controller 244. The main device 20 is also equipped with an image/audio feature extractor 245, a communication I/F unit 250, memory unit 260, a disc drive unit 270, a disc recording medium 271, and a system controller 280.

The network I/F unit 210 includes functionality for connecting to the network 60. The tuner unit 220 includes functionality for extracting desired program content from a broadcast wave received by the antenna 221. The recording medium 230 corresponds to a database. The recording controller 241 includes functionality for controlling the reading and writing of data with respect to the memory 260 and the disc recording medium 271.

The information processor 242 includes functionality for conducting various information processing. For example, the information processor 242 may include functionality for detecting CM segments from program content. For example, the information processor 242 may detect a CM segment on the basis of metadata attached to program content, and may also determine a CM segment on the basis of features extracted by the image/audio feature extractor 245. The playback processor 243 includes functionality for playing back program content. The display controller 244 includes functionality for controlling the display device 30 such that the display device 30 displays program content.

The image/audio feature extractor 245 extracts predetermined image features and audio features from image data and audio data in program content. Potential examples of image features include global features such as chroma features, luma features, and texture features, as well as local features such as the corner features of objects found by the Harris corner detector, and scale-invariant feature transform (SIFT). Potential audio features include the average audio level of a predetermined segment length, and the power spectrum of a predetermined frequency band. Predetermined recognition processes (such as a facial recognition process and an audio recognition process, for example) are conducted on the basis of these predetermined image features and audio features. Features extracted by the image/audio feature extractor 245 may also be used to determine a performer in program content, for example. Otherwise, features extracted by the image/audio feature extractor 245 may be used to determine key frames in program content. Also, these features are used to detect identical content or similar content.

The communication I/F unit 250 includes functionality for communicating with the tablet 10. The memory unit 260 is a recording medium built into the main device 20, and is capable of storing programs that induce the operation of components such as the recording controller 241, the information processor 242, the playback processor 243, the display controller 244, the image/audio feature extractor 245, and the system controller 280, for example. The memory unit 260 is also capable of storing various data used by programs.

The disc drive unit 270 includes functionality for driving program content recorded onto the disc recording medium 271. The disc recording medium 271 includes functionality for recording program content. For example, program content that has been scheduled for recording may start being recorded onto the disc recording medium 271 at a set recording start time, and stop being recorded to the disc recording medium 271 at a set recording stop time. However, recording may also start when a recording start operation is performed, and recording may also stop when a recording stop operation is performed.

The system controller 280 includes functionality for controlling all function blocks present inside the main device 20. Note that components such as the recording controller 241, the information processor 242, the playback processor 243, the display controller 244, the image/audio feature extractor 245, and the system controller 280 may correspond to a processor such as a CPU, for example. These function blocks are able to exhibit their respective functions as a result of the execution of programs stored by the memory unit 260, for example.

The foregoing thus describes an exemplary functional configuration of a main device 20 according to an embodiment of the present disclosure.

4. DESCRIPTION OF RELATED CONTENT ACQUISITION

Next, related content acquisition by the tablet 10 according to an embodiment of the present disclosure will be described in detail. As discussed earlier, the related content acquisition unit 133 of the tablet 10 acquires related content that relates to program content, but a variety of cases are envisioned regarding how the related content acquisition unit 133 acquires related content that relates to particular program content. For example, the related content acquisition unit 133 may acquire related content that relates to program content to be played back as the related content that relates to program content. This is because the user has a high likelihood of being strongly interested in program content to be played back, and thus has a high likelihood of also being interested in related content that relates to that program content.

The related content acquisition unit 133 may also acquire related content that relates to the most recently recorded program content as the related content that relates to program content. This is because, similarly to program content to be played back, the user has a high likelihood of being strongly interested in the most recently recorded program content, and thus has a high likelihood of also being interested in related content that relates to that program content. However, the methods by which the related content acquisition unit 133 acquires related content that relates to particular program content are not limited to these acquisition methods.

Likewise, the question of how to select such related content that relates to program content is not particularly limited. For example, in a case where program content has been selected for recording according to recording selection information used to select a recording target, the related content acquisition unit 133 may acquire related content according to the recording selection information. This is because the user has high likelihood of being strongly interested in such related content. Note that hereinafter, keywords used in order to select a recording target (hereinafter designated "recording search keywords") will be used as an example of recording selection information.

As another example, in a case where program content has been selected for playback according to playback selection information used to select a playback target, the related content acquisition unit 133 may acquire related content according to the playback selection information. This is because the user has high likelihood of being strongly interested in such related content. Note that hereinafter, keywords used in order to select a playback target (hereinafter designated "playback search keywords") will be used as an example of playback selection information.

As another example, in a case where program content has been selected for recording according to preregistered information, the related content acquisition unit 133 may acquire related content according to the preregistered information. This is because the user has high likelihood of being strongly interested in such related content. As another example, the related content acquisition unit 133 may also acquire related content according to metadata of program content. This is because the user has high likelihood of being strongly interested in such related content. Note that the metadata may be what is called "pre-metadata" or "post-metadata", as discussed earlier.

As another example, the related content acquisition unit 133 may also acquire related content that relates to a performer obtained as a result of conducting a predetermined recognition process (such as a facial recognition process or a speech recognition process, for example) on program content. Alternatively, the related content acquisition unit 133 may acquire related content that relates to extracted information (such as the name of a performer, the name of a product introduced on a program, or the name of a place appearing in a program, for example) extracted from a viewer's comment regarding program content.

FIG. 4 is a diagram illustrating a list of examples of acquiring related content. Also, FIG. 5 is a diagram illustrating a table of examples of acquiring related content. Note that the examples illustrated in FIGS. 4 and 5 are merely examples of related content acquisition, and thus the related content acquisition methods are obviously not limited to the examples illustrated in FIGS. 4 and 5.

First, as illustrated in FIG. 4, the case where the main device 20 plays back program content directly specified by a user (example (1) illustrated in FIG. 4) may involve situations such as the case of playing back program content that was selected as a recording target on the basis of preregistered information (example (1-1) illustrated in FIG. 4), or the case of recording the program content directly specified by the user (example (1-2) illustrated in FIG. 4).

For example, in the former case (example (1-1) illustrated in FIG. 4), the related content acquisition unit 133 of the tablet 10 may acquire related content according to preregistered information. Meanwhile, in the latter case (example (1-2) illustrated in FIG. 4), the related content acquisition unit 133 of the tablet 10 may acquire related content according to metadata of the program content, for example. The metadata may be what is called "pre-metadata" or "post-metadata", as discussed earlier.

Also, as illustrated in FIG. 4, the case where the main device 20 plays back program content selected on the basis of keywords (example (2) illustrated in FIG. 4) may involve situations such as the case where the program content only relates to recording search keywords (example (2-1) illustrated in FIG. 4, example "1" illustrated in FIG. 5), or the case where recording search keywords and playback search keywords are the same (example (2-2) illustrated in FIG. 4, example "2" illustrated in FIG. 5).

Furthermore, the case where the main device 20 plays back program content selected on the basis of keywords (example (2) illustrated in FIG. 4) may involve situations such as the case where recording search keywords and playback search keywords are different (example (2-3) illustrated in FIG. 4, example "3" illustrated in FIG. 5), or the case where the program content only relates to playback search keywords (example (2-4) illustrated in FIG. 4, example "4" illustrated in FIG. 5).

For example, in the first case (example (2-1) illustrated in FIG. 4, example "1" illustrated in FIG. 5), the related content acquisition unit 133 of the tablet 10 may acquire related content according to recording search keywords. As another example, in the second case (example (2-2) illustrated in FIG. 4, example "2" illustrated in FIG. 5), the related content acquisition unit 133 of the tablet 10 may acquire related content according to either of recording search keywords and playback search keywords.

As another example, in the third case (example (2-3) illustrated in FIG. 4, example "3" illustrated in FIG. 5), the related content acquisition unit 133 of the tablet 10 may acquire related content according to shared keywords between recording search keywords and playback search keywords. As another example, in the fourth case (example (2-4) illustrated in FIG. 4, example "4" illustrated in FIG. 5), the related content acquisition unit 133 of the tablet 10 may acquire related content according to playback search keywords.

Although it is envisioned that techniques like those indicated above will be used to select keywords for use in searching for related content, various techniques for creating keywords for use in searching for related content are also envisioned, and are not particularly limited. Next, examples of creating keywords for use in searching for related content will be described.

Figure 6:
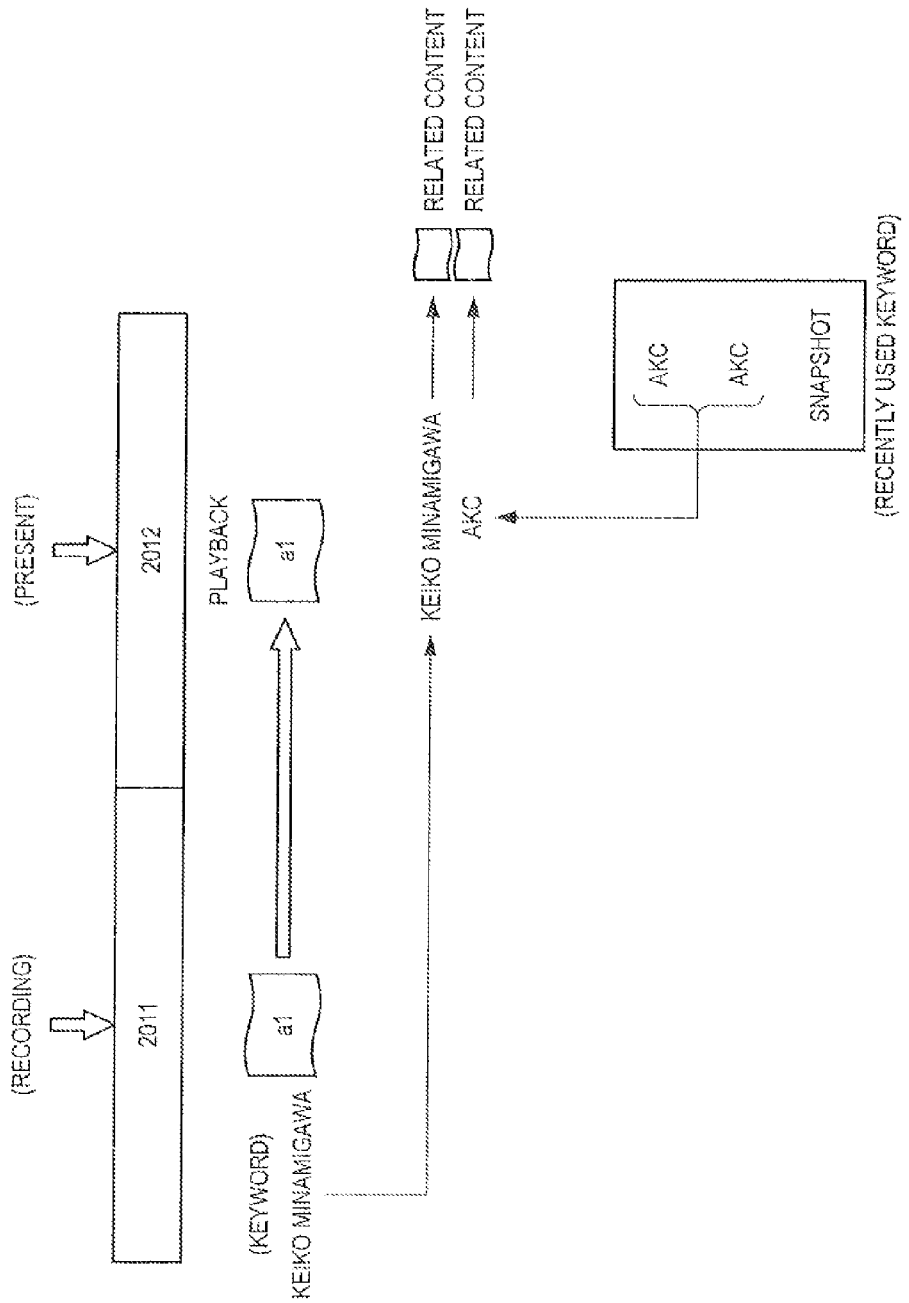
FIG. 6 is a diagram illustrating an example of creating keywords used to acquire related content (for the case of using a recently used keyword)

FIG. 6 is a diagram illustrating an example of creating keywords used to acquire related content (for the case of using a recently used keyword). As illustrated in FIG. 6, consider the case where program content a1 that was previously selected according to the keyword "Keiko Minamigawa" has been recorded, and this program content a1 is currently selected for playback. In such a case, situations such as the case where related content according to the keyword does not exist, or the case where the number of related content items according to the keyword does not reach a desired number (the case where the same related content would be repeated) are envisioned, for example.

In such cases, the related content acquisition unit 133 may additionally acquire related content according to a recently used keyword (for example, a recently used recording search keyword). For example, in a case where multiple recently used keywords exist, the related content acquisition unit 133 may acquire related content according to the keyword used most often from among the multiple keywords. In the example illustrated in FIG. 6, related content is additionally acquired according to the keyword "AKC" used most often from among recently used keywords.

Note that although related content is acquired by setting a recording search keyword and a recently used keyword to the same priority in the example illustrated in FIG. 6, one keyword may also be prioritized other another keyword. For example, in a case where the program content a1 was recorded at a time that is older than a predetermined time, a recently used keyword may be prioritized over a recording search keyword (the recently used keyword may also be used alone, without using the recording search keyword, for example).

FIG. 7 is a diagram illustrating an example of creating keywords used to acquire related content (for the case of using a keyword used in the past). As illustrated in FIG. 7, consider the case where program content b1 that was previously selected according to the keyword "snapshot" has been recorded, and this program content b1 is currently selected for playback. In such a case, situations such as the case where related content according to the keyword does not exist, or the case where the number of related content items according to the keyword does not reach a desired number (the case where the same related content would be repeated) are envisioned, for example.

In such cases, the related content acquisition unit 133 may additionally acquire related content according to a keyword used to search for program content recorded at the time closest to the recording time of the program content b1. For example, in a case where there exist multiple keywords used to search for program content recorded at the time closest to the recording time of the program content b1, the related content acquisition unit 133 may acquire related content according to the keyword used most often from among the multiple keywords. In the example illustrated in FIG. 7, related content is additionally acquired according to the keyword "pink" used most often from among keywords used to search for program content recorded at the time closest to the recording time of the program content b1.

Note that although related content is acquired by setting a recording search keyword and a keyword used to search for program content recorded at the time closest to the recording time of the program content b1 to the same priority in the example illustrated in FIG. 7, one keyword may also be prioritized other another keyword. For example, in a case where the program content b1 was recorded at a time that is older than a predetermined time, a keyword used to search for program content recorded at the time closest to the recording time of the program content b1 may be prioritized over a recording search keyword (the keyword used to search for program content recorded at the time closest to the recording time of the program content b1 may also be used alone, without using the recording search keyword, for example).

Next, an example of the flow of data up to related content acquisition and an example of the flow of operations up to related content acquisition will be described. FIG. 8 is a diagram illustrating an example of the flow of data up to related content acquisition. Also, FIG. 9 is a diagram illustrating an example of the flow of operations up to related content acquisition.

Note that the example illustrated in FIG. 8 is merely an example of the flow of data up to related content acquisition, and thus the flow of data up to related content acquisition is obviously not limited to the example illustrated in FIG. 8. Similarly, the example illustrated in FIG. 9 is merely an example of the flow of operations up to related content acquisition, and thus the flow of operations up to related content acquisition is obviously not limited to the example illustrated in FIG. 9.

As illustrated in FIG. 8, program content contains multiple scenes. Some of these multiple scenes may be main feature (such as the scenes labeled with the titles "Opening", "Popular Cake Shop", and "Today's Book" in the example illustrated in FIG. 8), whereas others may be CMs inserted before and after the main features (such as the scene labeled with the title "CM" in the example illustrated in FIG. 8).

Among the multiple scenes, there also exist scenes that are associated with related content. In the example illustrated in FIG. 8, related content is associated with a scene having a scene ID of "0004". Note that, as illustrated in FIG. 8, there exists information regarding related content directly associated with a scene (hereinafter also referred to as "related content information"). It is also possible to acquire related content on the basis of information for identifying related content that is included in such related content information (a Uniform Resource Locator (URL) in the example illustrated in FIG. 8).

Note that, as illustrated in FIG. 8, the example herein assumes the case where the post-metadata server 42 is storing scene information, which is information regarding each of the multiple scenes, and related content information, while the related content server 41 is storing related content. However, the servers that respectively store scene information, related content information, and related content are not particularly limited.

As illustrated in FIG. 9, when the main device 20 records or plays back program content (S1), the tablet 10 transmits to the post-metadata server 42 a scene information request for acquiring the scene information for that program content (S2). In response to the scene information request, the post-metadata server 42 transmits the scene information for that program content to the tablet 10 (S3). Note that the information for specifying program content is not particularly limited, and may be a combination of the start date and time of the program content, the end date and time of the program content, and the station broadcasting the program content, for example.

Additionally, the tablet 10 transmits to the post-metadata server 42 a related content existing scene information request, which is used to acquire related content existing scene information that indicates scenes for which related content exists (S4). In response to the related content existing scene information request, the post-metadata server 42 transmits the related content existing scene information for that program content to the tablet 10 (S5).

Subsequently, the tablet 10 extracts a desired scene ID from the related content existing scene information, and transmits to the post-metadata server 42 a related content information request containing the extracted scene ID (S6). In response to the related content information request, the post-metadata server 42 transmits related content information associated with that scene to the tablet 10 (S7).

Subsequently, the tablet 10 extracts an URL contained in the related content information, and transmits to the related content server 41 a related content request containing the extracted URL (S8). In response to the related content request, the related content server 41 transmits related content existing at that URL to the tablet 10 (S9).

Subsequently, upon receiving related content from the related content server 41, the tablet 10 plays back that related content (S10). Time code synchronization is performed between the program content played back by the main device 20 and the related content played back by the tablet 10.

The foregoing thus describes an example of the flow of data up to related content acquisition and an example of the flow of operations up to related content acquisition. According to such operations, specifying a scene for which related content exists enables related content information for that scene to be acquired, thereby making it possible to reduce the communication load compared to the case of acquiring related content information for the entire program content.

Furthermore, since the presence or absence of related content is separated from the scene information, the management of scene information is simplified for the server system 40, while also making it possible for the tablet 10 side to reuse scene information that has already been acquired, as long as the scene itself is not updated. Also, configuring the post-metadata server 42 that manages related content information and the related content server 41 that manages the related content itself as separate servers makes it possible to distribute the processing load among the server system 40.

The foregoing thus describes in detail related content acquisition by a tablet 10 according to an embodiment of the present disclosure.

5. DESCRIPTION OF RELATED CONTENT DISPLAY CONTROL

Next, related content display control by a tablet 10 according to an embodiment of the present disclosure will be described in detail. As discussed earlier, the display controller 135 of the tablet 10 controls related content such that related content is displayed after program content is recorded, but a variety of techniques are envisioned regarding the related content display control.

FIG. 10 is a diagram illustrating an example of the display of related content (for the case of using a banner ad). The display controller 135 may apply control such that related content K1 is displayed on a screen displayed on the touch panel display 138. For example, the display controller 135 may apply control such that the related content K1 is displayed at a predetermined position on a selection screen 1381 used to select program content to be played back, as illustrated in FIG. 10.

Note that although the related content K1 is envisioned to be a banner ad that proceeds to a linked page when selected in the example illustrated in FIG. 10, the related content K1 may be a type of content other than a banner ad. Also, the screen displaying the related content K1 may also be a screen other than a selection screen 1381 used to select program content to be played back.

FIG. 11 is a diagram illustrating an example of the display of related content (for the case of using a pre-roll ad). The display controller 135 may apply control such that related content K4 is displayed on a screen displayed on the display device 30. For example, the display controller 135 may apply control to insert related content before program content C1 to be played back, such that related content K4 is displayed before the program content C1 to be played back, as illustrated in FIG. 11.

Although the display controller 135 inserts related content before the program content C1 to be played back in the example illustrated in FIG. 11, the position where related content is inserted may also be after the program content C1 to be played back, or in the middle of the program content C1 to be played back. In other words, the position where related content is inserted is not particularly limited.

Note that although the scenes of the program content C1 are envisioned to change in the order of a main feature H1, a CM, a main feature H2, a CM, and a main feature H3 in the example illustrated in FIG. 11, the structure of the program content C1 obviously is not limited to such a structure. The related content K4 may also be any content.

Although the above illustrates the case of displaying related content that is separate content from the program content as an example, the program content itself may also be displayed after being modified. FIG. 12 is a diagram illustrating an example of skipping a CM included in program content. For example, the display controller 135 may skip some of the CMs included in program content C1, or skip all of the CMs. For example, the display controller 135 may apply control to display a CM included in program content C1 in a case where that CM satisfies a predetermined parameter, and skip display of that CM in a case where the CM does not satisfy the predetermined parameter.

FIG. 12 illustrates an example of skipping a CM present between a main feature H2 and a main feature H3. For example, if a CM is inserted at a climactic portion of the main feature, there is a high likelihood of impeding the viewing of the main feature, and thus it may be configured such that the CM at that position is skipped. A climactic portion may be determined on the basis of a recognition result obtained as a result of performing a predetermined recognition process (speech recognition, for example) based on the image features or audio features discussed earlier with respect to program content, and may also be determined on the basis of comments from viewers written regarding the program content, such as the post-metadata or other metadata information discussed earlier. For example, in the case of using image/audio features, it is possible to determine a climactic portion in a case where a person's face image is detected and the speech level is equal to or greater than a predetermined threshold value, or in a case where the audio spectral power in a predetermined frequency band, such as that of people cheering, is equal to or greater than a predetermined threshold value.

By skipping a CM included in program content C1 in this way, it is possible to shorten the playback time of the program content C1, while additionally raising the effectiveness of advertising by the CMs which are not skipped. Meanwhile, if a CM is present between separate corners constituting a main feature, for example, there is a low likelihood of impeding the viewing of the main feature, and thus the CM at that position may be left in.

FIG. 13 is a diagram illustrating an example of moving a CM included in program content. For example, the display controller 135 may move some of the CMs included in program content C1, or move all of the CMs. For example, the display controller 135 may apply control to not move a CM included in program content C1 in a case where the program content C1 satisfies a predetermined parameter, and move the CM in a case where the program content C1 does not satisfy the predetermined parameter.

FIG. 13 illustrates an example of moving a CM present between a main feature H1 and a main feature H2, and a CM present between the main feature H2 and a main feature H3, to before the program content C1. For example, in a case where the program content C1 is in a particular genre (such as drama or a motion picture, for example), there is a high likelihood that CMs would impede viewing of the main feature, and thus control may be applied to move CMs included in the program content C1. On the other hand, in a case where the type of the program content C1 is not in a particular genre, there is a low likelihood that CMs would impede viewing of the main feature, and thus control may be applied to not move CMs included in the program content C1.

Note that the possibility of consecutively repeating the same CM is envisioned as a result of moving CMs. In the case of consecutively repeating the same CM, there is a possibility of causing a viewer viewing the program content to lose interest in the CM. Consequently, in the case of consecutively repeating the same CM, the display controller 135 may replace some or all of the affected CMs with other CMs. CM replacement may also be performed such that similar CMs are played consecutively. Potential examples of similar CMs include different CMs having the same performers, or different CMs having the same advertised product or product type. It is conceivable to detect the same or similar CMs from content being stored on a predetermined server on the basis of a predetermined frame-by-frame matching process using the predetermined image features or audio features discussed earlier. For CM detection, it is conceivable to conduct a matching process by calculating a distance (content-to-content distance Cd) that sums a per-frame distance calculation value (frame-to-frame distance Fd) for just the time length (frame length) of the CM content to be detected, and then comparing the computed distance Cd against a predetermined threshold value (Dth). At this point, detecting the same CM or similar CMs is possible by varying the value of Dth. In other words, the process is conducted by setting Dth to a small value Dths in the case of detecting the same CM, and setting Dth to a large value compared to Dths (Dths<Dthm) in the case of detecting similar CMs.

A CM performer may also be determined on the basis of a recognition result obtained as a result of conducting a predetermined recognition process (such as a facial recognition process or a speech recognition process, for example) on program content, for example. Alternatively, a CM performer may be determined on the basis of comments written by viewers regarding the program content, or on the basis of information specifying a performer in a case where such information is included in the metadata attached to a CM.

The related content K1 displayed at a predetermined position on a selection screen 1381 used to select program content to be played back may or may not be related to the related content K4 inserted into program content to be played back.

For example, in a case where a selection operation is conducted on the related content K1, there is a high likelihood that the viewer is interested in the related content K1, and thus the display controller 135 may apply control to display related content K4 that is similar or identical to the related content K1. On the other hand, in a case where a selection operation is not conducted on the related content K1, there is a high likelihood that the viewer is not interested in the related content K1, and thus the display controller 135 may apply control to display related content K4 with a low similarity to the related content K1.

The related content whose display is controlled by the display controller 135 may or may not be related to program content to be played back. FIG. 14 is a diagram illustrating an example of the display of related content (for the case of using related content that relates to program content to be played back). The operation screen 1382 for program content to be played back illustrated in FIG. 14 is a screen that is transitioned to in a case where a viewer selects program content to be played back on the selection screen 1381 used to select program content to be played back, for example. For example, if the viewer performs a play operation on program content to be played back on the operation screen 1382, the program content to be played back is played back.

The display controller 135 may apply control such that related content (related content K2 and related content K3, for example) is displayed at predetermined positions on the operation screen 1382 for program content to be played back, as illustrated in FIG. 14. The related content K2 and the related content K3 respectively relate to program content to be played back. In other words, the description herein envisions the case where the related content acquisition unit 133 acquires related content that relates to program content to be played back as the related content, as already discussed.

Various timings are envisioned for the related content display timings. For example, in a case where the program content to be played back contains program segments, the related content acquisition unit 133 may acquire related segments that relate to the program segments, and the display controller 135 may apply control to display the related segments at timings that correspond to the display timings of the program segments.

Figure 15:
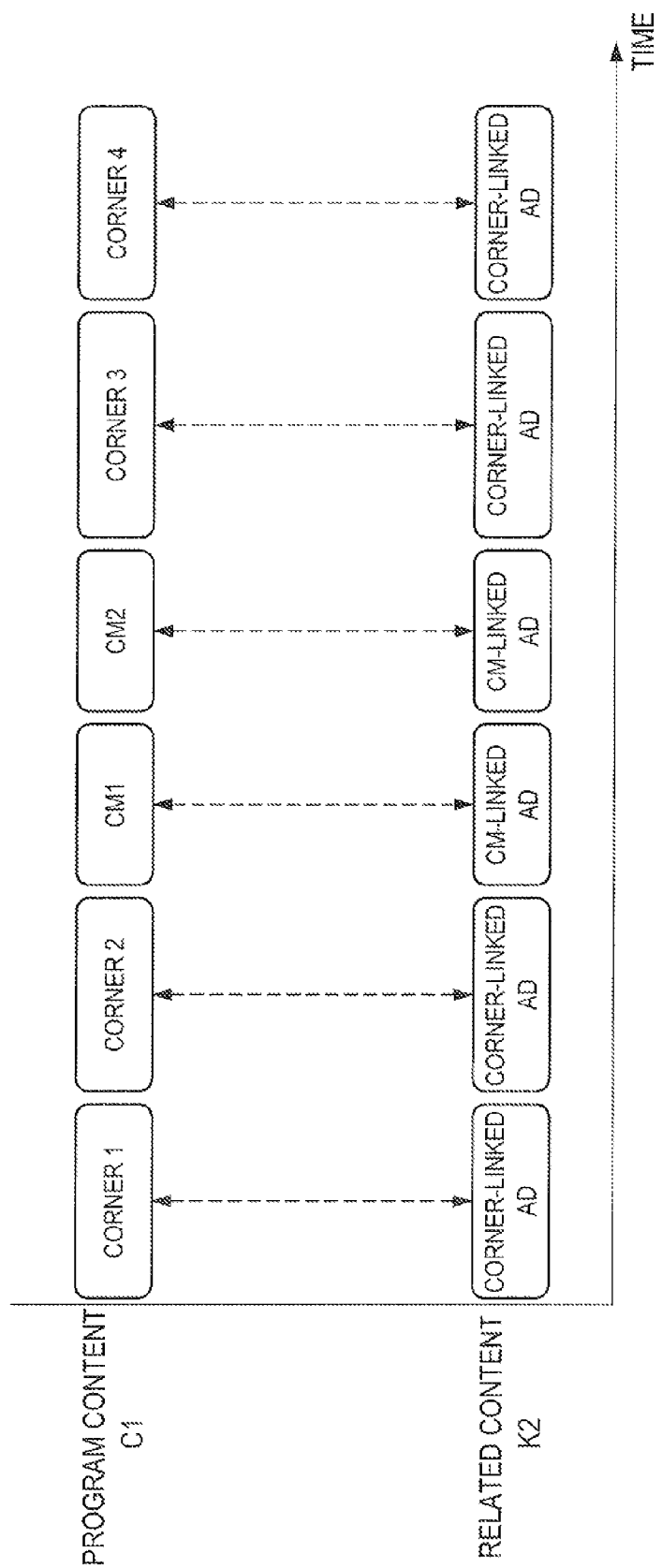
FIG. 15 is a diagram illustrating an example of display timings for program content and related content.

FIG. 15 is a diagram illustrating an example of display timings for program content C1 and related content K2. In the example illustrated in FIG. 15, the program segments corresponds to the corners and CMs constituting the program content. Related to the program segments constituting the program content C1 (in the example illustrated in FIG. 15, a Corner 1, a Corner 2, a CM 1, a CM 2, a Corner 3, and a Corner 4) are related segments (in the example illustrated in FIG. 15, a corner-linked ad, a corner-linked ad, a CM-linked ad, a CM-linked ad, a corner-linked ad, and a corner-linked ad).

Although program segments and related segments are displayed simultaneously in the example illustrated in FIG. 15, the program segments and related segments may also not be displayed simultaneously. For example, a related segment may be displayed a predetermined amount of time after the display timing of a program segment. Furthermore, although the display times of program segments and the display times of related segments are of the same length in the example illustrated in FIG. 15, the respective display times may also differ.

Meanwhile, a CM included in program content may be skipped by fast-forwarding in some cases. In such cases, enabling a viewer to ascertain the CM skipped by fast-forwarding may create a chance to get the viewer interested in that CM. Consequently, CMs that have been skipped by fast-forwarding may also be displayed as a CM list. The tablet 10 may acquire a CM list from the main device 20 as program content metadata, for example.

Figure 16:
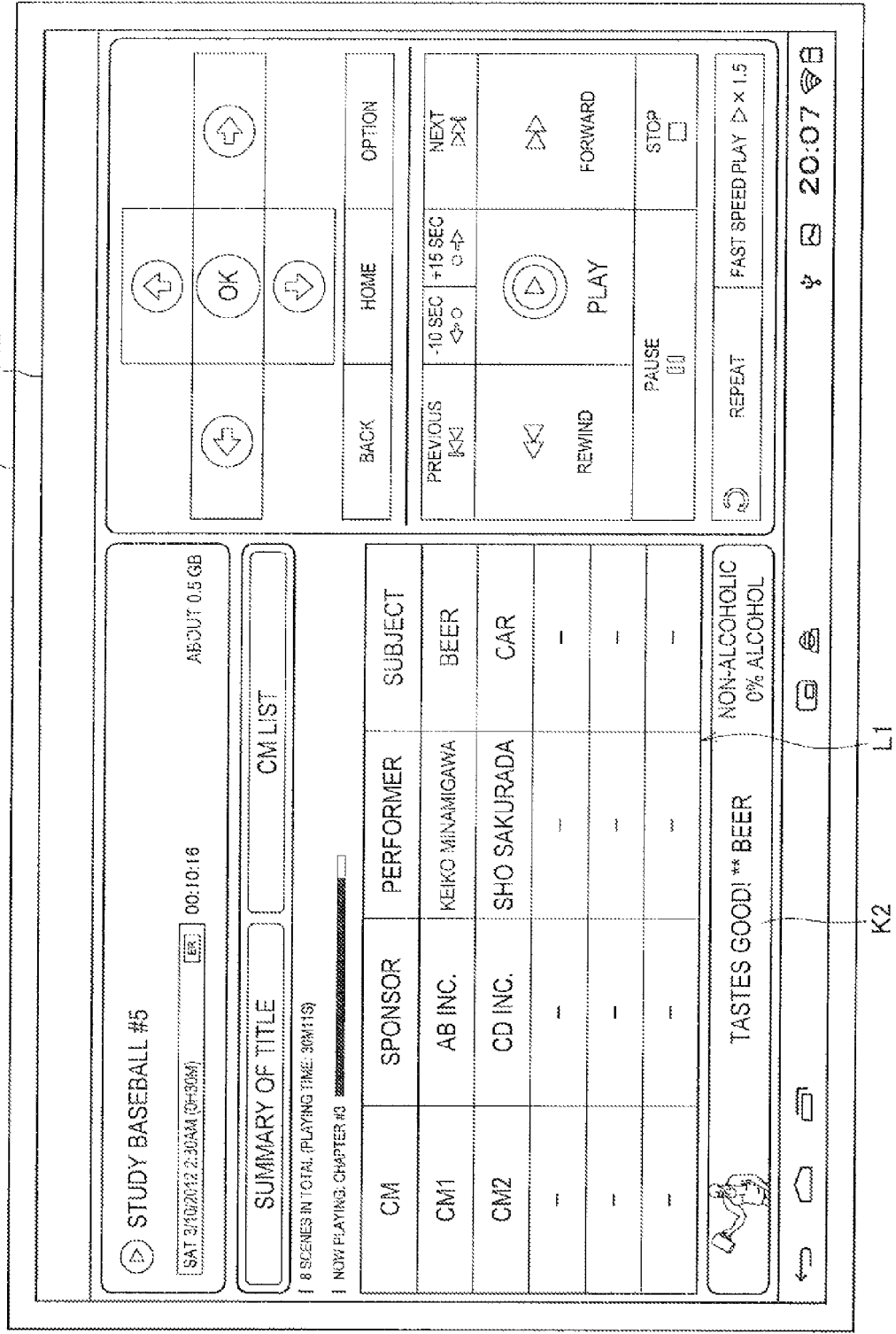
FIG. 16 is a diagram illustrating an example of a CM list displayed in the case of skipping a CM.

FIG. 16 is a diagram illustrating an example of a CM list displayed in the case of skipping a CM. As illustrated in FIG. 16, in a case where CMs included in program content are skipped by fast-forwarding, the display controller 135 may apply control such that information indicating the CMs is displayed as a CM list L1. In the example illustrated in FIG. 16, the CM list L1 includes "CM", "Sponsor", "Performer", and "Subject" fields as information for identifying CMs. However, the information included in the CM list L1 is not particularly limited.

Also, the order of information included in the CM list L1 is not particularly limited. For example, information regarding CMs that a viewer has already viewed may be displayed at positions on the CM list L1 that are easily seen by the viewer (such as at the top of the CM list L1, for example). Also, a marker indicating that a CM has been viewed may also be displayed at positions corresponding to information on CMs that the viewer has already viewed.

Note that CMs may be skipped irrespective of the CM type, or alternatively, skippable CMs and non-skippable CMs may be provided. For example, in a case where a fast-forward operation is performed on a CM related to the keywords described earlier (such as the recording search keywords, playback search keywords, or preregistered information, for example), the display controller 135 may apply control to not skip that CM, or to skip that CM while presenting a display indicating that the CM relates to the keywords.

As another example, in a case where a fast-forward operation is performed on a CM that relates to a performer in program content to be played back, the display controller 135 may apply control to not skip that CM, or to skip that CM while presenting a display indicating that the CM relates to the performer.

Also envisioned is the case where a CM constituting part of a CM series is included in program content. In such a case, if a fast-forward operation is not performed on the CM, the display controller 135 may determine that the viewer is interested in that CM, and apply control to display the rest of the CM series containing that CM. Furthermore, before displaying the rest of the CM series, the display controller 135 may also apply control to display a confirmation screen regarding whether or not to display the rest of the CM series.

In addition, a CM generated further in the past than a predetermined time may also be replaced with another CM. The other CM may be acquired by the tablet 10 from a predetermined server via the network 60. Also, in the case of acquiring information for specifying the viewer using the tablet 10, a CM may be acquired according to the viewer on the basis of the information for specifying the viewer. The specification of a viewer may be conducted on the basis of preference information based on a program content playback history, or on the basis of information such as a result from facial recognition on a captured image, a result from speech recognition on recorded audio data, or fingerprint information acquired from a viewer.

In this way, if related content is displayed on the tablet 10 while program content is being displayed on the display device 30, there is a possibility that a viewer may concentrate on viewing the related content and neglect to view the program content. Thus, a process for not impeding the viewing of program content may also be executed.

Specifically, in a case where the display controller 135 applies control to display related content the tablet 10 then accesses a site outside of a predetermined range during playback of program content, the display controller 135 may apply control to stop playback of the program content. The site outside of a predetermined range herein may be a site provided by a device that is neither the related content server 41, the post-metadata server 42, nor the main device 20. As another example, the display controller 135 may also apply control to resume playback of program content in a case where the tablet 10 accesses a site back within the predetermined range.

As another example, information indicating that a CM has already been played back may be attached to CMs that have been played back from among CMs included in program content. A CM with attached information indicating that the CM has already been played back may be played back on the basis of an operation by the viewer, or made viewable by the viewer later according to display control by the display controller 135.

Figure 17:
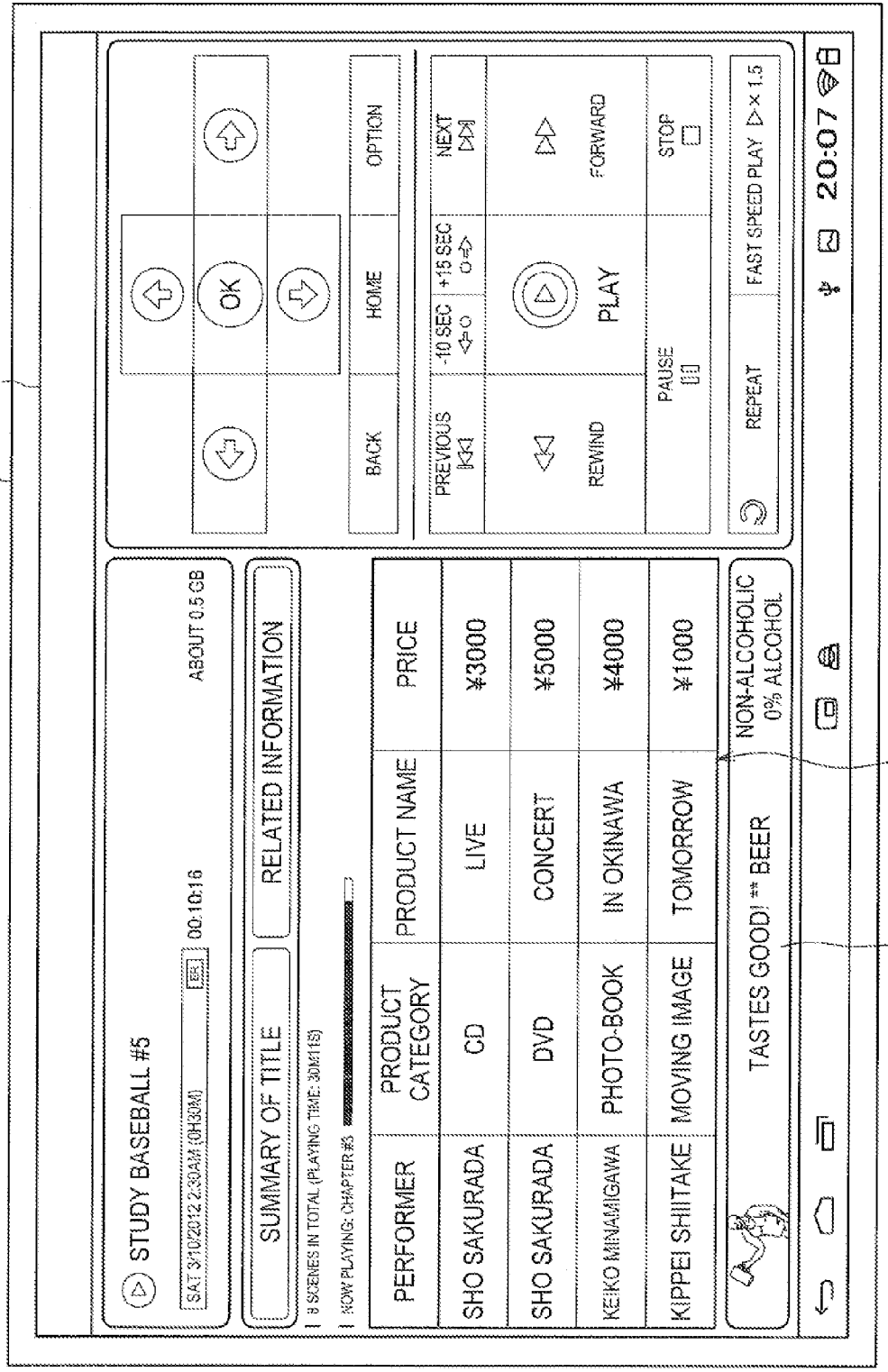
FIG. 17 is a diagram illustrating an example of the display of related content (for the case of using related content that relates to program content to be played back)

FIG. 17 is a diagram illustrating an example of the display of related content (for the case of using related content that relates to program content to be played back). The operation screen 1382 for program content to be played back illustrated in FIG. 17 is a screen that is transitioned to in a case where a viewer selects program content to be played back on the selection screen 1381 used to select program content to be played back, for example. For example, if the viewer performs a play operation on program content to be played back on the operation screen 1382, the program content to be played back is played back.

As illustrated in FIG. 17, the display controller 135 may apply control such that a related content list L2 is displayed at a predetermined position on the operation screen 1382 for program content to be played back. Each related content item present on the related content list L2 relates to program content to be played back. In other words, the description herein envisions the case where the related content acquisition unit 133 acquires individual related content items that relate to program content to be played back, as already discussed. Each related content item present on the related content list L2 contains "Performer", "Product Category", "Product Name", and "Price" fields as an example, but related content items are not limited to such an example.

In this way, the case where there exist a plurality of pieces of related content relating to program content is envisioned. In such a case, the display controller 135 may specify a priority ranking for each of the plurality of pieces of related content, and apply control to display each of the plurality of pieces of related content according to the priority rankings that respectively correspond to each of the plurality of pieces of related content. For example, the display controller 135 may specify a priority ranking for each of the plurality of pieces of related content on the basis of predetermined information used to select program content (such as keywords used to select program content, for example).

For example, the display controller 135 may specify a higher priority ranking for keywords used to select program content (such as recording search keywords, playback search keywords, or preregistered information, for example) than for keywords not used to select program content. The display controller 135 may also apply control to display related content with higher priority rankings at positions that are easily seen by the viewer (such as at the top of the related content list L2, for example).

The foregoing thus describes related content display control by a tablet 10 according to an embodiment of the present disclosure.

6. EXEMPLARY OPERATION OF DISPLAY CONTROL SYSTEM

Figure 18:
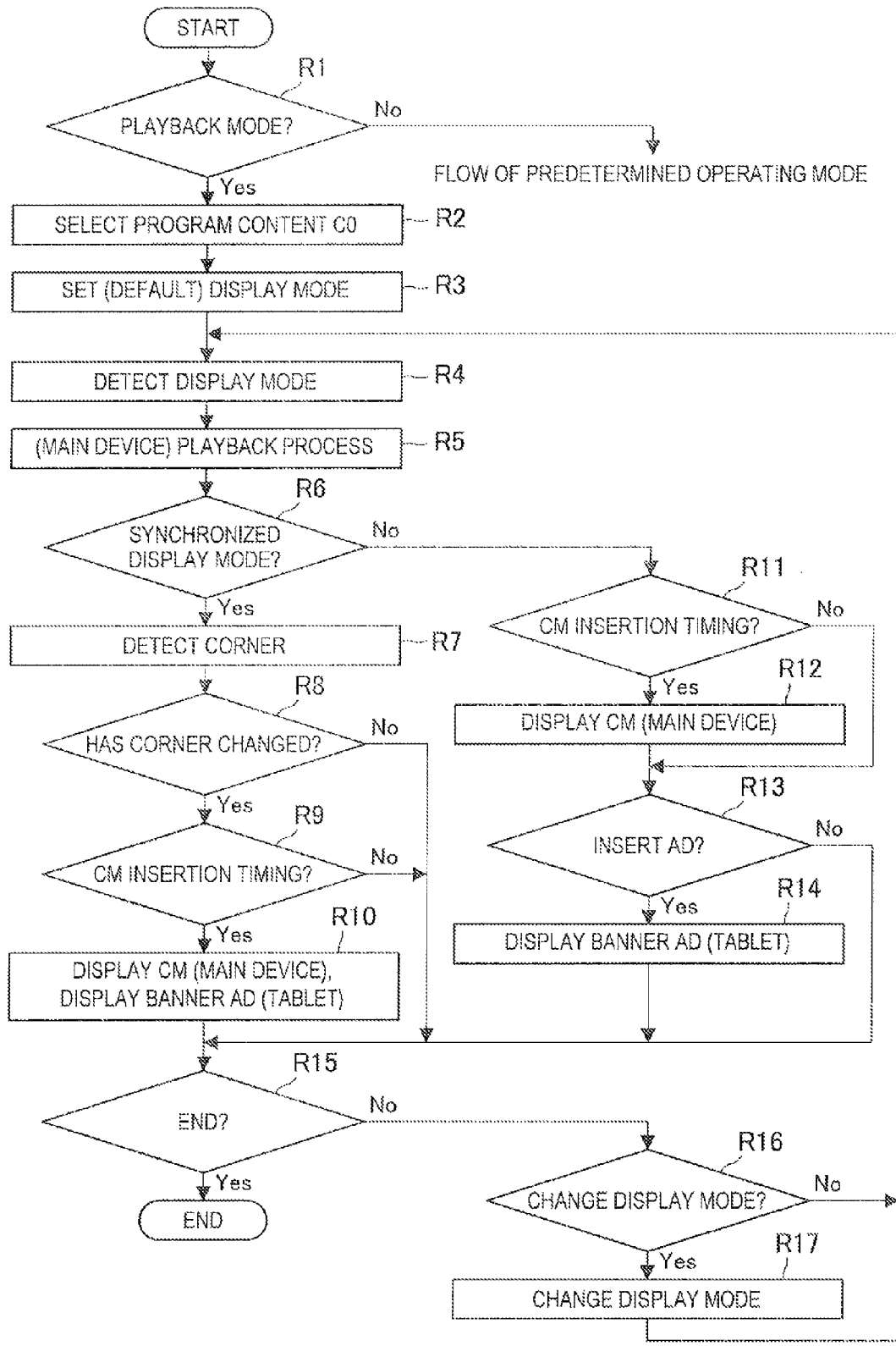
FIG. 18 is a flowchart illustrating an example of the flow of operation (main operation) by a display control system according to an embodiment of the present disclosure.

Next, operation of a display control system 1 according to an embodiment of the present disclosure will be described. FIG. 18 is a flowchart illustrating an example of the flow of operation (main operation) by a display control system 1 according to an embodiment of the present disclosure. Note that the flow of operation (main operation) by the display control system 1 illustrated in FIG. 18 is merely an example, and thus the flow of operation (main operation) by the display control system 1 is not limited to the example illustrated in FIG. 18.

As illustrated in FIG. 18, first the tablet 10 determines whether or not the operating mode is a playback mode (R1), with operation proceeding to a flow for a predetermined operating mode in a case where the operating mode is not the playback mode (R1, No). The flow of the predetermined operating mode, although not illustrated herein, is not particularly limited.

Meanwhile, in a case where the operating mode is the playback mode (R1, Yes), the tablet 10 selects program content C0 (R2), and sets a default display mode (R3). The tablet 10 detects the display mode (R4), and the main device 20 conducts a playback process for the program content C0 (R5). Subsequently, the tablet 10 determines whether or not the display mode is a synchronized display mode (R6).

The synchronized display mode corresponds to the mode in the earlier example in which related content is displayed at a timing corresponding to the display timing of program content. The tablet 10 proceeds to R7 in a case where the display mode is the synchronized display mode (R6, Yes). On the other hand, the tablet 10 proceeds to the operation in R11 in a case where the display mode is not the synchronized display mode (R6, No).

In the case of proceeding to the operation in R7, the tablet 10 detects a corner from the program content C0 (R7), and determines whether or not the currently detected corner has changed from the last detected corner (R8). The detection of a corner may be conducted on the basis of metadata of the program content C0 (such as pre-metadata or post-metadata, for example), or on the basis of a result of conducting a predetermined recognition process (such as a facial recognition process or a speech recognition process on the program content C0.

The tablet 10 proceeds to the operation in R15 in a case where the corner has not changed (R8, No). On the other hand, in a case where the corner has changed (R8, Yes), the tablet 10 determines whether or not the current timing is a CM insertion timing with respect to a main feature constituting the program content C0 (R9).

The tablet 10 proceeds to the operation in R15 in a case where the current timing is not a CM insertion timing with respect to a main feature constituting the program content C0 (R9, No). On the other hand, in a case where the current timing is a CM insertion timing with respect to a main feature constituting the program content C0 (R9, Yes), the main device 20 displays a CM by inserting the CM into the main feature constituting the program content C0, and the tablet 10 displays a banner ad included in related content that relates to the program content C0 (R10).

In the case of proceeding to the operation in R11, the tablet 10 determines whether or not the current timing is a CM insertion timing with respect to a main feature constituting the program content C0 (R11). The tablet 10 proceeds to the operation in R13 in a case where the current timing is not a CM insertion timing with respect to a main feature constituting the program content C0 (R11, No). On the other hand, in a case where the current timing is a CM insertion timing with respect to a main feature constituting the program content C0 (R11, Yes), the main device 20 displays a CM by inserting the CM into the main feature constituting the program content C0 (R12), and proceeds to the operation in R13.

In the case of proceeding to the operation in R13, the tablet 10 determines whether or not the current timing is an ad insertion timing with respect to a main feature constituting related content (R13). The tablet 10 proceeds to the operation in R15 in a case where the current timing is not an ad insertion timing with respect to a main feature constituting related content (R13, No). On the other hand, in a case where the current timing is an ad insertion timing with respect to a main feature constituting related content (R13, Yes), the tablet 10 displays a banner ad by inserting the banner ad into the main feature constituting related content (R14), and proceeds to the operation in R15.

Subsequently, the tablet 10 determines whether or not to end operation (R15), and ends operation in the case of determining to end operation (R15, Yes). On the other hand, in the case of determining to not end operation (R15, No), the tablet 10 determines whether or not to change the display mode (R16), and proceeds to the operation in R4 in the case of determining to not change the display mode (R16, No). On the other hand, in the case of determining to change the display mode (R16, Yes), the tablet 10 changes the display mode (R17), and proceeds to the operation in R4.

FIG. 19 is a flowchart illustrating an example of the flow of operation by a display control system 1 according to an embodiment of the present disclosure (for the case of using related content linked to program content to be played back). Note that the flow of operation (for the case of using related content linked to program content to be played back) by the display control system 1 illustrated in FIG. 19 is merely an example, and thus the flow of operation (for the case of using related content linked to program content to be played back) is not limited to the example illustrated in FIG. 19.

As illustrated in FIG. 19, first the tablet 10 determines whether or not the operating mode is a special playback mode (Q1), and in a case where the operating mode is not the special playback mode (Q1, No), conducts an ordinary display process (Q5), and proceeds to the operation in Q4. The special playback mode corresponds to fast-forward playback in the earlier example. Also, the ordinary display process corresponds to a process that displays related content.

On the other hand, in a case where the operating mode is the special playback mode (Q1, Yes), the tablet 10 acquires full CM information on all CMs in the program content being played back (Q2), and conducts a list display process on the basis of the acquired full CM information (Q3). The full CM information corresponds to the CM list L1 in the earlier example. Subsequently, the tablet 10 determines whether or not to end operation (Q4), and ends operation in the case of determining to end operation (Q4, Yes). On the other hand, the tablet 10 proceeds to the operation in Q1 in the case of determining to not end operation (Q4, No).

Operation by the main device 20 is conducted in parallel with operation by the tablet 10. First, the main device 20 determines whether or not the operating mode is a special playback mode (P1), and in a case where the operating mode is not the special playback mode (P1, No), conducts an ordinary display process (P4), and proceeds to the operation in P5. The special playback mode corresponds to fast-forward playback in the earlier example. Also, the ordinary display process corresponds to a process that displays program content.

Meanwhile, in a case where the operating mode is the special playback mode (P1, Yes), the main device 20 determines whether or not the current playback position of the program content is in a CM segment (P2). The main device 20 proceeds to the operation in P5 in a case where the current playback position of the program content is not in a CM segment (P2, No). On the other hand, in a case where the current playback position of the program content is in a CM segment (P2, Yes), the main device 20 determines whether or not a CM relates to keywords (P3).

The main device 20 proceeds to the operation in P5 in a case where a CM does not relate to keywords (P3, No). On the other hand, in a case where a CM relates to keywords (P3, Yes), the main device 20 conducts the ordinary display process (P4), and proceeds to the operation in P5. The ordinary display process corresponds to the process of displaying program content in the earlier example. The main device 20 determines whether or not to end operation (P5), and ends operation in the case of determining to end operation (P5, Yes). On the other hand, the main device 20 proceeds to the operation in P1 in the case of determining to not end operation (P5, No).

FIG. 20 is a flowchart illustrating an example of the flow of operation by a display control system 1 according to an embodiment of the present disclosure (for the case of using related content linked to program content to be played back). Note that the flow of operation (for the case of using related content linked to program content to be played back) by the display control system 1 illustrated in FIG. 20 is merely an example, and thus the flow of operation (for the case of using related content linked to program content to be played back) is not limited to the example illustrated in FIG. 20.

As illustrated in FIG. 20, first the tablet 10 determines whether or not the operating mode is a special playback mode (Q1), and in a case where the operating mode is not the special playback mode (Q1, No), conducts an ordinary display process (Q5), and proceeds to the operation in Q6. The special playback mode corresponds to fast-forward playback in the earlier example. Also, the ordinary display process corresponds to a process that displays related content.

On the other hand, in a case where the operating mode is the special playback mode (Q1, Yes), the tablet 10 acquires full CM information on all CMs in the program content being played back (Q2), and conducts a list display process on the basis of the acquired full CM information (Q3). The full CM information corresponds to the CM list L1 in the earlier example.

Subsequently, the tablet 10 determines whether or not the current playback position of the program content is in a CM segment (P2). The tablet 10 proceeds to the operation in Q4 in a case where the current playback position of the program content is not in a CM segment (P2, No). On the other hand, in a case where the current playback position of the program content is in a CM segment (P2, Yes), the main device 20 determines whether or not a CM relates to keywords (P3).

The tablet 10 proceeds to the operation in Q4 in a case where a CM does not relate to keywords (P3, No). On the other hand, the tablet 10 proceeds to the operation in Q6 in a case where a CM relates to keywords (P3, Yes). In the case of proceeding to the operation in Q6, the tablet 10 transmits a display request to the main device 20 (Q6), and then proceeds to the operation in Q4. Subsequently, the tablet 10 determines whether or not to end operation (Q4), and ends operation in the case of determining to end operation (Q4, Yes). On the other hand, the tablet 10 proceeds to the operation in Q1 in the case of determining to not end operation (Q4, No).

Operation by the main device 20 is conducted in parallel with operation by the tablet 10. First, the main device 20 determines whether or not a display request has been received from the tablet 10 (P6). The main device 20 proceeds to the operation in P5 in a case where a display request has not been received from the tablet 10 (P6, No).

On the other hand, in a case where a display request has been received from the tablet 10 (P6, Yes), the main device 20 conducts an ordinary display process (P4), and proceeds to the operation in P5. The ordinary display process corresponds to the process of displaying program content in the earlier example. The main device 20 determines whether or not to end operation (P5), and ends operation in the case of determining to end operation (P5, Yes). On the other hand, the main device 20 proceeds to the operation in P1 in the case of determining to not end operation (P5, No).

Figure 21:
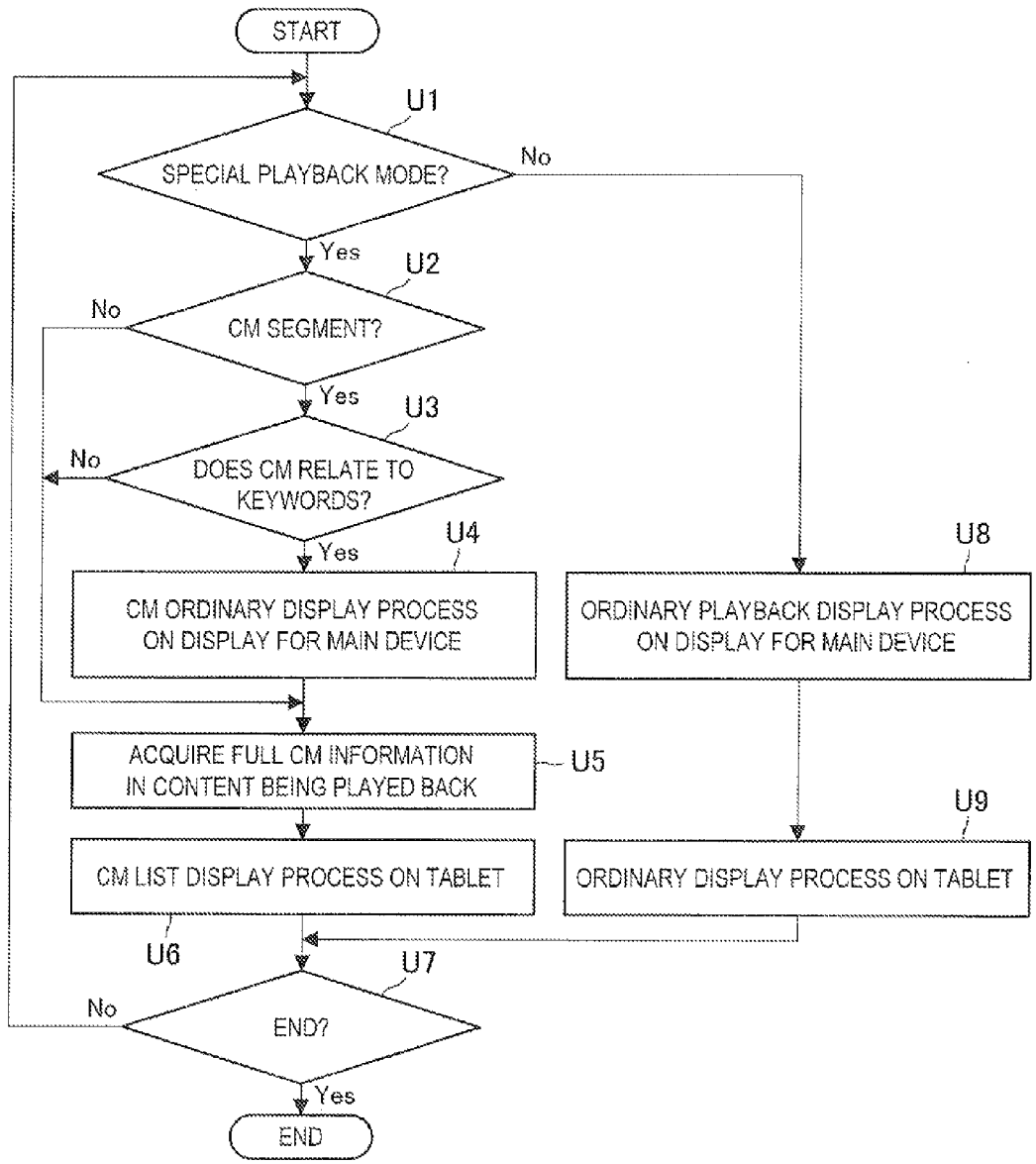
FIG. 21 is a flowchart illustrating an example of the flow of operation by a display control system according to an embodiment of the present disclosure (for the case of using related content linked to program content to be played back)

FIG. 21 is a flowchart illustrating an example of the flow of operation by a display control system 1 according to an embodiment of the present disclosure (for the case of using related content linked to program content to be played back). Note that the flow of operation (for the case of using related content linked to program content to be played back) by the display control system 1 illustrated in FIG. 21 is merely an example, and thus the flow of operation (for the case of using related content linked to program content to be played back) is not limited to the example illustrated in FIG. 21.

As illustrated in FIG. 21, first the tablet 10 or the main device 20 determines whether or not the operating mode is a special playback mode (U1), and in a case where the operating mode is not the special playback mode (U1, No), conducts an ordinary display process on the display for the main device (U8), conducts an ordinary display process on the tablet (U9), and proceeds to the operation in U7. The special playback mode corresponds to fast-forward playback in the earlier example. Also, the ordinary display process on the display for the main device corresponds to a process causing the main device 20 to display program content on the display device 30, while the ordinary display process on the tablet corresponds to a process causing the tablet 10 to display related content.

Meanwhile, in a case where the operating mode is the special playback mode (U1, Yes), the tablet 10 or the main device 20 determines whether or not the current playback position of the program content is in a CM segment (U2). The tablet 10 or the main device 20 proceeds to the operation in U5 in a case where the current playback position of the program content is not in a CM segment (U2, No). On the other hand, in a case where the current playback position of the program content is in a CM segment (U2, Yes), the tablet 10 or the main device 20 determines whether or not a CM relates to keywords (U3).

The tablet 10 or the main device 20 proceeds to the operation in U5 in a case where a CM does not relate to keywords (U3, No). On the other hand, the tablet 10 or the main device 20 proceeds to the operation in U4 in a case where a CM does not relate to keywords (U3, Yes). In the case of proceeding to the operation in U5, the tablet 10 acquires full CM information on all CMs in the program content being played back (U5), and conducts a CM list display process on the tablet, on the basis of the acquired full CM information (U6). The full CM information corresponds to the CM list L1 in the earlier example.

In the case of proceeding to the operation in U7, the tablet 10 and the main device 20 determine whether or not to end operation (U7), and end operation in the case of determining to end operation (U7, Yes). On the other hand, the tablet 10 and the main device 20 proceed to the operation in U1 in the case of determining to not end operation (U7, No).

Figure 22:
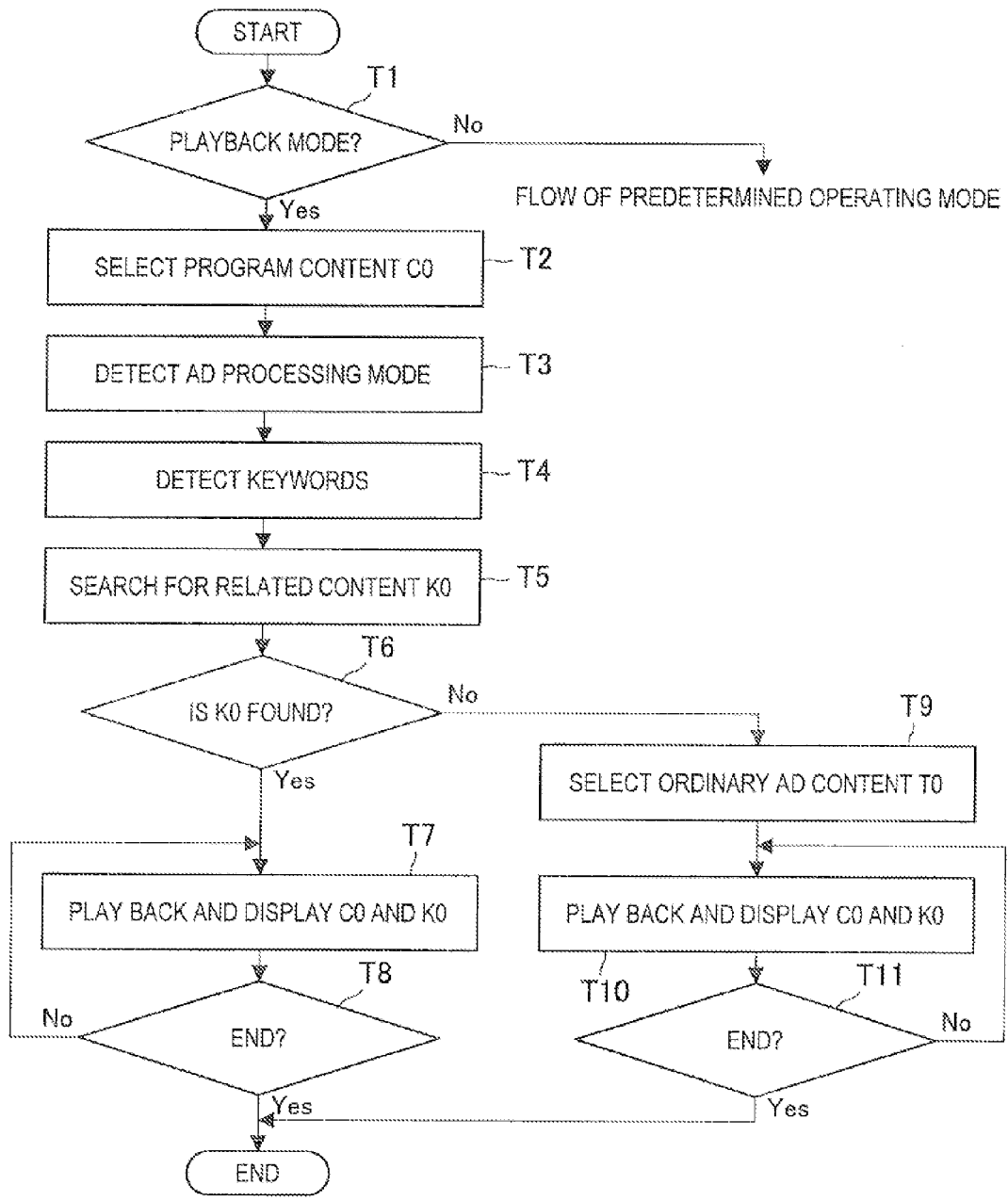
FIG. 22 is a flowchart illustrating an example of the flow of operation by a display control system according to an embodiment of the present disclosure (for the case of using related content according to keywords)

FIG. 22 is a flowchart illustrating an example of the flow of operation by a display control system 1 according to an embodiment of the present disclosure (for the case of using related content according to keywords). Note that the flow of operation (for the case of using related content according to keywords) by the display control system 1 illustrated in FIG. 22 is merely an example, and thus the flow of operation (for the case of using related content according to keywords) is not limited to the example illustrated in FIG. 22.

As illustrated in FIG. 22, first the tablet 10 determines whether or not the operating mode is a playback mode (T1), with operation proceeding to a flow for a predetermined operating mode in a case where the operating mode is not the playback mode (T1, No). The flow of the predetermined operating mode, although not illustrated herein, is not particularly limited.

Meanwhile, in a case where the operating mode is the playback mode (T1, Yes), the tablet 10 selects program content C0 (T2), and detects an ad processing mode (T3). The ad processing mode corresponds to the mode indicating which keywords to detect from among recording search keywords, playback search keywords, preregistered information, or the like in the earlier example. Subsequently, the tablet 10 detects keywords according to the ad processing mode (T4), and searches for related content K0 according to the keywords (T5).

In a case where related content K0 is found (T6, Yes), the main device 20 applies control to play back and display the program content C0, while the tablet 10 applies control to play back and display the related content K0 (T7). The tablet 10 determines whether or not to end operation (T8), and ends operation in the case of determining to end operation (T8, Yes). On the other hand, the tablet 10 proceeds to the operation in T7 in the case of determining to not end operation (T8, No).

Meanwhile, in a case where related content K0 is not found (T6, No), the tablet 10 selects ordinary ad content T0 (T9). The ordinary ad content T0 is content that is acquirable irrespective of keywords, and is made available in advance. Subsequently, the main device 20 applies control to play back and display the program content C0, while the tablet 10 applies control to play back and display the ordinary ad content T0 (T10). The tablet 10 determines whether or not to end operation (T11), and ends operation in the case of determining to end operation (T11, Yes). On the other hand, the tablet 10 proceeds to the operation in T10 in the case of determining to not end operation (T11, No).

Figure 23:
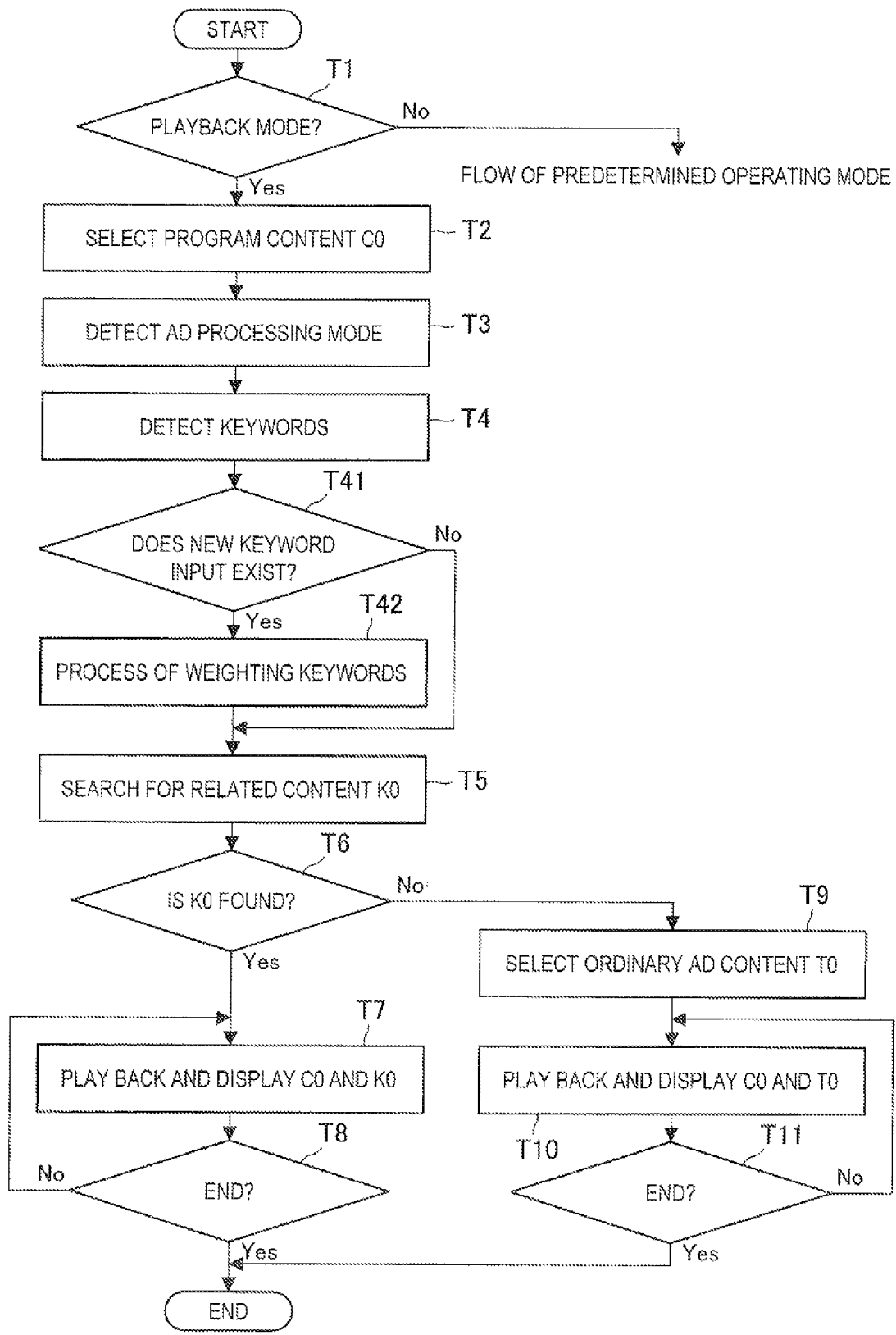
FIG. 23 is a flowchart illustrating an example of the flow of operation by a display control system according to an embodiment of the present disclosure (for the case of using related content according to keywords).

FIG. 23 is a flowchart illustrating an example of the flow of operation by a display control system 1 according to an embodiment of the present disclosure (for the case of using related content according to keywords). Note that the flow of operation (for the case of using related content according to keywords) by the display control system 1 illustrated in FIG. 23 is merely an example, and thus the flow of operation (for the case of using related content according to keywords) is not limited to the example illustrated in FIG. 23.

As illustrated in FIG. 23, first the tablet 10 determines whether or not the operating mode is a playback mode (T1), with operation proceeding to a flow for a predetermined operating mode in a case where the operating mode is not the playback mode (T1, No). The flow of the predetermined operating mode, although not illustrated herein, is not particularly limited.

Meanwhile, in a case where the operating mode is the playback mode (T1, Yes), the tablet 10 selects program content C0 (T2), and detects an ad processing mode (T3). The ad processing mode corresponds to the mode indicating which keywords to detect from among recording search keywords, playback search keywords, preregistered information, or the like in the earlier example. Subsequently, the tablet 10 detects keywords according to the ad processing mode (T4).

The tablet 10 determines whether or not new keyword input exists (T41). A new keyword is a keyword input during a period extending back a predetermined amount of time from the present, for example. The tablet 10 proceeds to the operation in T5 in a case where new keyword input does not exist (T41, No). On the other hand, in a case where new keyword input does exist (T41, Yes), the tablet 10 conducts a keyword weighting process, that is, a process of weighting the new keywords in order to raise the importance of the new keywords (T42), and then proceeds to the operation in T5.

The keyword weighting process may also be conducted on a new keyword specified from a search history for older program content in a database, for example. How much the tablet 10 weights new keywords is not particularly limited. Subsequently, the tablet 10 searches for related content K0 according to keywords (T5).

In a case where related content K0 is found (T6, Yes), the main device 20 applies control to play back the program content C0 while also displaying the played back program content C0, while the tablet 10 applies control to play back the related content K0 while also displaying the played back related content K0 (T7). The tablet 10 determines whether or not to end operation (T8), and ends operation in the case of determining to end operation (T8, Yes). On the other hand, the tablet 10 proceeds to the operation in T7 in the case of determining to not end operation (T8, No).

Meanwhile, in a case where related content K0 is not found (T6, No), the tablet 10 selects ordinary ad content T0 (T9). The ordinary ad content T0 is content that is acquirable irrespective of keywords, and is made available in advance. Subsequently, the main device 20 applies control to play back and display the program content C0, while the tablet 10 applies control to play back and display the ordinary ad content T0 (T10). The tablet 10 determines whether or not to end operation (T11), and ends operation in the case of determining to end operation (T11, Yes). On the other hand, the tablet 10 proceeds to the operation in T10 in the case of determining to not end operation (T11, No).

7. CONCLUSION

As described in the foregoing, according to an embodiment of the present disclosure, it is possible to provide a display control device equipped with a related content acquisition unit 133 that acquires related content that relates to program content, and a display controller 135 that applies control such that related content is displayed after program content is recorded. According to such a configuration, there is provided technology for displaying related content after program content is recorded. Consequently, it is possible to provide a user with related content that accounts for information such as the user's rating of the program content, for example.

With the technology of the present disclosure, it becomes possible to present related content to a viewer more effectively. As a result, it becomes possible to raise the likelihood of generating new business via related content. Moreover, by viewing related content provided by the technology of the present disclosure, it is anticipated that obtaining more effective related information (such as product information, for example) will become easier for the viewer. Furthermore, the viewer also becomes able to enjoy program content while also enjoying related content that relates to the program content.

It should be understood by those skilled in the art that various modifications, combinations, sub-combinations and alterations may occur depending on design requirements and other factors insofar as they are within the scope of the appended claims or the equivalents thereof.

For example, the respective steps in the exemplary operation by the display control system 1 in this specification are not strictly limited to being processed in a time series following the sequences described as flowcharts herein. For example, the respective steps in the exemplary operation of the display control system 1 may be processed in a sequence that differs from the sequences described herein, and furthermore may be processed in parallel.

Additionally, it is also possible to create a program that causes hardware such as a CPU, ROM, and RAM built into a computer to exhibit the same functionality as the configurations of the devices described in the foregoing (such as the tablet 10, the main device 20, the related content server 41, and the post-metadata server 42, for example). A computer-readable recording medium storing such a program may also be provided.

Although the foregoing embodiments describe the processing of program content, it is also conceivable to apply the present technology to other video content besides program content that includes predetermined image/audio information. For example, it is conceivable to apply processes according to an embodiment of the present technology in the case of playing back a recording medium storing a motion picture or other software content that includes predetermined CMs or advertising information. In such cases, the disc drive unit 270 in FIG. 3 plays back the predetermined video content.

Note that cases where the video content does not include audio information are also conceivable. Furthermore, it is also conceivable to apply processes according to an embodiment of the present technology in the case of streaming video content stored on a predetermined server on a network, or in the case of playback after downloading video content to predetermined local storage. In such cases, predetermined content is accessed via the network I/F unit 210 in FIG. 3, or the recording medium 230 is used as local storage to downloaded and record predetermined content.

It is also conceivable for the video content herein to be a predetermined scene segment constituting part of predetermined content. For example, the video content is conceivably a program scene, program corner, or CM segment of predetermined program content in which a predetermined entertainer appears.

(1) A display control device including:
a related content acquisition unit that acquires related content that relates to predetermined video content; and a display controller that applies control to display the related content after the predetermined video content is recorded.

(2) The display control device according to (1),
wherein, in a case where the predetermined video content is selected as a recording target according to recording selection information used to select the recording target, the related content acquisition unit acquires the related content according to the recording selection information.

(3) The display control device according to (1),
wherein, in a case where the predetermined video content is selected as a playback target according to playback selection information used to select the playback target, the related content acquisition unit acquires the related content according to the playback selection information.

(4) The display control device according to (1),
wherein, in a case where the predetermined video content is selected as a recording target according to preregistered information, the related content acquisition unit acquires the related content according to the preregistered information.

(5) The display control device according to (1),
wherein the related content acquisition unit acquires the related content according to metadata of the predetermined video content.

(6) The display control device according to any one of (1) to (5),
wherein the related content acquisition unit acquires, as the related content that relates to the predetermined video content, related content that relates to video content to be played back.

(7) The display control device according to any one of (1) to (5),
wherein the related content acquisition unit acquires, as the related content that relates to the predetermined video content, related content that relates to predetermined video content recorded recently.

(8) The display control device according to (1),
wherein the display controller applies control to insert the related content before video content to be played back in a manner that the related content is displayed before the video content to be played back.

(9) The display control device according to (1),
wherein, in a case where video content to be played back includes a predetermined video segment, the related content acquisition unit acquires a related segment that relates to the predetermined video segment, and
wherein the display controller applies control to display the related segment at a timing corresponding to a display timing of the predetermined video segment.

(10) The display control device according to (1),
wherein the display controller applies control to display the related content at a predetermined position on a selection screen used to select video content to be played back.

(11) The display control device according to (1),
wherein the display controller applies control to display the related content at a predetermined position on an operation screen for video content to be played back.

(12) The display control device according to (1),
wherein, in a case where there exist a plurality of pieces of the related content that relates to the predetermined video content, the display controller specifies a priority ranking for each of the plurality of pieces of the related content, and applies control to display each of the plurality of pieces of the related content at a position according to the priority ranking that corresponds to each of the plurality pieces of the related content.

(13) The display control device according to (12),
wherein the display controller specifies the priority ranking for each of the plurality of pieces of the related content based on predetermined information used to select the predetermined video content.

(14) The display control device according to (1),
wherein the related content acquisition unit acquires related content that relates to a performer obtained as a result of conducting a predetermined recognition process on the predetermined video content.

(15) The display control device according to (1),
wherein the related content acquisition unit acquires related content that relates to extracted information extracted from viewer comments regarding the predetermined video content.

(16) The display control device according to (1),
wherein, in a case where advertising content included in the predetermined video content is played back by fast-forwarding, the display controller applies control to display information indicating that advertising content.

(17) The display control device according to (1),
wherein the display controller applies control to display advertising content included in the predetermined video content in a case where that advertising content satisfies a predetermined condition, and to skip display of that advertising content in a case where that advertising content does not satisfy the predetermined condition.

(18) The display control device according to (1),
wherein, in a case where the display controller applies control to display the related content, and the display control device then accesses a site outside a predetermined range during playback of the predetermined video content, the display controller applies control to stop playback of the predetermined video content.

(19) A recording control device including:
a recording controller that applies control to record predetermined video content; and
a display controller that applies control to display the predetermined video content;
wherein control is applied to display related content that relates to the predetermined video content after the predetermined video content is recorded by the recording controller.

(20) A display control method including:
acquiring related content that relates to predetermined video content; and
applying control to display the related content after the predetermined video content is recorded.

The present disclosure contains subject matter related to that disclosed in Japanese Priority Patent Application JP 2012-201548 filed in the Japan Patent Office on Sep. 13, 2012, the entire content of which is hereby incorporated by reference.

What is claimed is:
1. A display control device comprising:
a related content acquisition unit that acquires related content that relates to predetermined video content; and
a display controller that applies control to display the related content after the predetermined video content is recorded,
wherein, in a case where a plurality of pieces of the related content that relates to the predetermined video content exists, the display controller (i) specifies a priority ranking for each of the plurality of pieces of the related content based on information used to select the predetermined video content, and (ii) applies control to display each of the plurality pieces of the related content at a position according to the priority ranking that corresponds to each of the plurality pieces of the related content.

2. The display control device according to claim 1, wherein, in a case where the predetermined video content is selected as a recording target according to recording selection information used to select the recording target, the related content acquisition unit acquires the related content according to the recording selection information.

3. The display control device according to claim 1, wherein, in a case where the predetermined video content is selected as a playback target according to playback selection information used to select the playback target, the related content acquisition unit acquires the related content according to the playback selection information.

4. The display control device according to claim 1, wherein, in a case where the predetermined video content is selected as a recording target according to preregistered information, the related content acquisition unit acquires the related content according to the preregistered information.

5. The display control device according to claim 1, wherein the related content acquisition unit acquires the related content according to metadata of the predetermined video content.

6. The display control device according to claim 1, wherein the related content acquisition unit acquires, as the related content that relates to the predetermined video content, related content that relates to video content to be played back.

7. The display control device according to claim 1, wherein the related content acquisition unit acquires, as the related content that relates to the predetermined video content, related content that relates to predetermined video content recorded recently.

8. The display control device according to claim 1, wherein the display controller applies control to insert the related content before video content to be played back in a manner that the related content is displayed before the video content to be played back.

9. The display control device according to claim 1, wherein, in a case where video content to be played back includes a predetermined video segment, the related content acquisition unit acquires a related segment that relates to the predetermined video segment, and wherein the display controller applies control to display the related segment at a timing corresponding to a display timing of the predetermined video segment.

10. The display control device according to claim 1, wherein the display controller applies control to display the related content at a predetermined position on a selection screen used to select video content to be played back.

11. The display control device according to claim 1, wherein the display controller applies control to display the related content at a predetermined position on an operation screen for video content to be played back.

12. The display control device according to claim 1, wherein the related content acquisition unit acquires related content that relates to a performer obtained as a result of conducting a predetermined recognition process on the predetermined video content.

13. The display control device according to claim 1, wherein the related content acquisition unit acquires related content that relates to extracted information extracted from viewer comments regarding the predetermined video content.

14. The display control device according to claim 1, wherein, in a case where advertising content included in the predetermined video content is played back by fast-forwarding, the display controller applies control to display information indicating that advertising content.

15. The display control device according to claim 1, wherein the display controller applies control to display advertising content included in the predetermined video content in a case where that advertising content satisfies a predetermined condition, and to skip display of that advertising content in a case where that advertising content does not satisfy the predetermined condition.

16. The display control device according to claim 1, wherein, in a case where the display controller applies control to display the related content, and the display control device then accesses a site outside a predetermined range during playback of the predetermined video content, the display controller applies control to stop playback of the predetermined video content.

17. A recording control device comprising:
a recording controller that applies control to record predetermined video content; and
a display controller that applies control to display the predetermined video content;
wherein control is applied to display related content that relates to the predetermined video content after the predetermined video content is recorded by the recording controller, and
wherein, in a case where a plurality of pieces of the related content that relates to the predetermined video content exists, the display controller (i) specifies a priority ranking for each of the plurality of pieces of the related content based on information used to select the predetermined video content, and (ii) applies control to display each of the plurality pieces of the related content at a position according to the priority ranking that corresponds to each of the plurality pieces of the related content.

18. A display control method comprising:
acquiring related content that relates to predetermined video content; and
applying control to display the related content after the predetermined video content is recorded,
wherein, in a case where a plurality of pieces of the related content that relates to the predetermined video content exists, the applying includes (i) specifying a priority ranking for each of the plurality of pieces of the related content based on information used to select the predetermined video content, and (ii) applying control to display each of the plurality of pieces of the related content at a position according to the priority ranking that corresponds to each of the plurality pieces of the related content.

19. The display control device according to claim 1, wherein the information used to select the predetermined video content is a keyword or keywords such that the priority ranking specified by the display controller is based on the keyword or keywords.

* * * * *